(12) United States Patent
Zhu et al.

(10) Patent No.: US 10,033,616 B1
(45) Date of Patent: Jul. 24, 2018

(54) STATE SYNCHRONIZATION FOR GLOBAL CONTROL IN A DISTRIBUTED SECURITY SYSTEM

(71) Applicant: Juniper Networks, Inc., Sunnyvale, CA (US)

(72) Inventors: Xiao Ping Zhu, Beijing (CN); Huaxiang Yin, Beijing (CN); Zheling Yang, Beijing (CN); Chao Chen, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 1080 days.

(21) Appl. No.: 14/227,524

(22) Filed: Mar. 27, 2014

(51) Int. Cl.
*H04L 12/26* (2006.01)
*H04L 12/911* (2013.01)

(52) U.S. Cl.
CPC ............. *H04L 43/10* (2013.01); *H04L 43/16* (2013.01); *H04L 47/70* (2013.01)

(58) Field of Classification Search
CPC ............. H04L 63/0236; H04L 63/1458; H04L 63/1408; H04L 43/10; H04L 43/16; H04L 47/70
See application file for complete search history.

(56) References Cited

U.S. PATENT DOCUMENTS

| | | | |
|---|---|---|---|
| 5,247,497 A * | 9/1993 | Cohn | H04M 3/382 369/26.01 |
| 5,832,429 A * | 11/1998 | Gammel | G10L 15/063 704/243 |
| 6,412,007 B1 * | 6/2002 | Bui | H04L 63/10 709/217 |
| 6,412,077 B1 * | 6/2002 | Roden | H04L 67/141 714/4.21 |
| 6,442,608 B1 * | 8/2002 | Knight | H04L 63/10 709/225 |
| 6,816,901 B1 * | 11/2004 | Sitaraman | H04L 63/101 709/217 |
| 2002/0080796 A1 * | 6/2002 | Matsuoka | H04L 12/5693 370/395.4 |
| 2004/0176161 A1 * | 9/2004 | Shelby | G06Q 30/02 463/25 |
| 2006/0053487 A1 * | 3/2006 | Jeffries | H04L 63/1458 726/22 |

(Continued)

*Primary Examiner* — Aaron Strange
(74) *Attorney, Agent, or Firm* — Harrity & Harrity, LLP

(57) ABSTRACT

A device may comprise security processing units (SPUs) including a SPU to receive a session request. The SPU may identify global counter information and update counter information. The global counter information may include a global counter identifier and a global counter value. The update counter information may include an update counter identifier and an update counter value. The SPU may identify a global limit associated with the global counter, may determine that the global limit has not been met, and may cause the session to be created. The SPU may create a modified global counter value. The SPU may create a modified update counter value. The SPU may determine that a local update message is required based on the modified update counter value, and may provide the local update message to another SPU. The local update message may include the global counter identifier and the modified global counter value.

20 Claims, 22 Drawing Sheets

(56) References Cited

U.S. PATENT DOCUMENTS

| | | | |
|---|---|---|---|
| 2007/0019543 A1* | 1/2007 | Wei | H04L 63/1458 370/229 |
| 2008/0005780 A1* | 1/2008 | Singleton | G06F 21/552 726/1 |
| 2008/0288644 A1* | 11/2008 | Gilfix | H04L 67/2814 709/227 |
| 2010/0333150 A1* | 12/2010 | Broerman | H04L 67/1008 725/93 |
| 2013/0246507 A1* | 9/2013 | Amemiya | H04L 67/2814 709/203 |
| 2014/0165133 A1* | 6/2014 | Foley | H04L 63/14 726/1 |
| 2014/0280442 A1* | 9/2014 | Jiang | H04L 67/1097 709/201 |
| 2015/0006641 A1* | 1/2015 | Murugesan | H04L 51/16 709/206 |

* cited by examiner

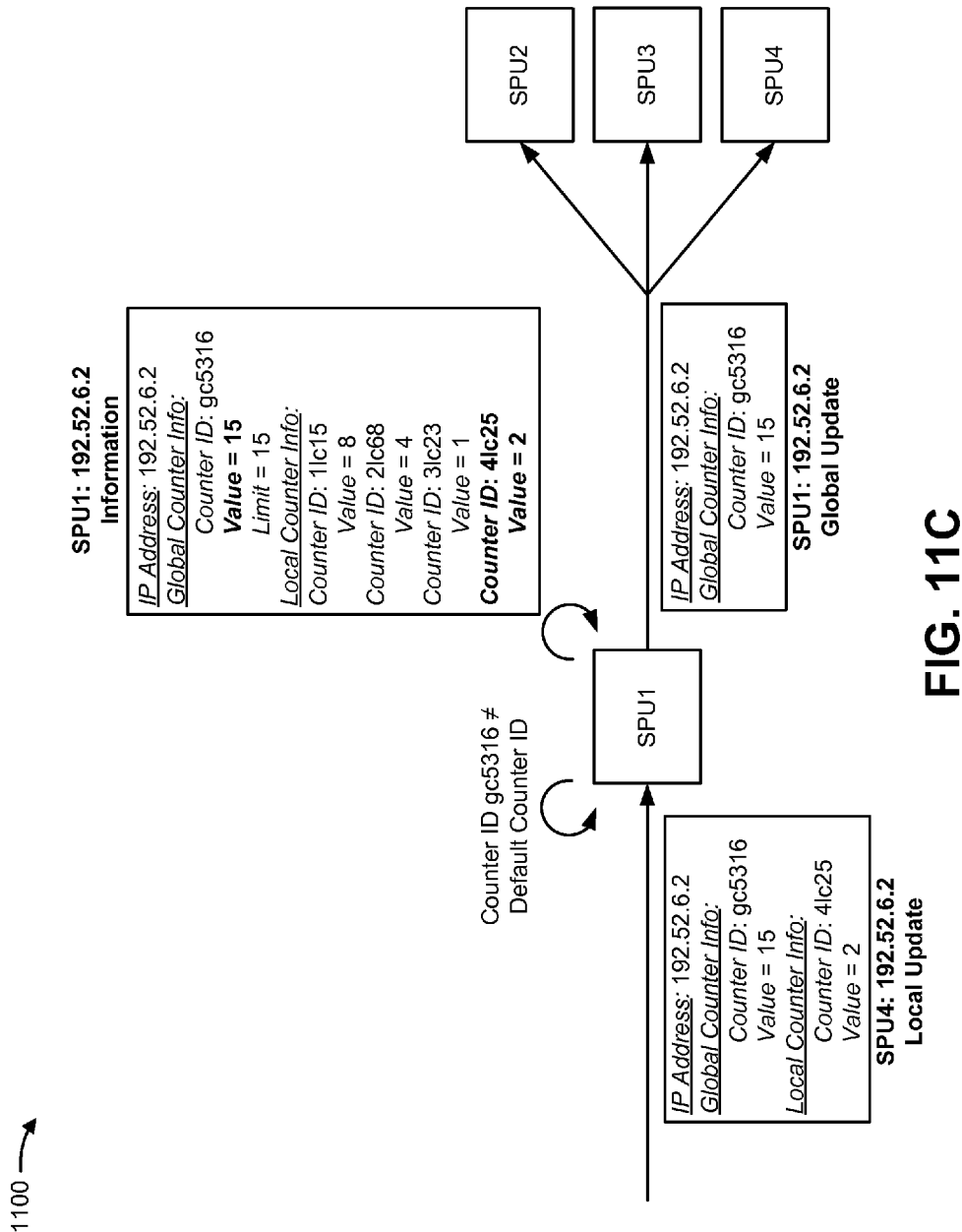

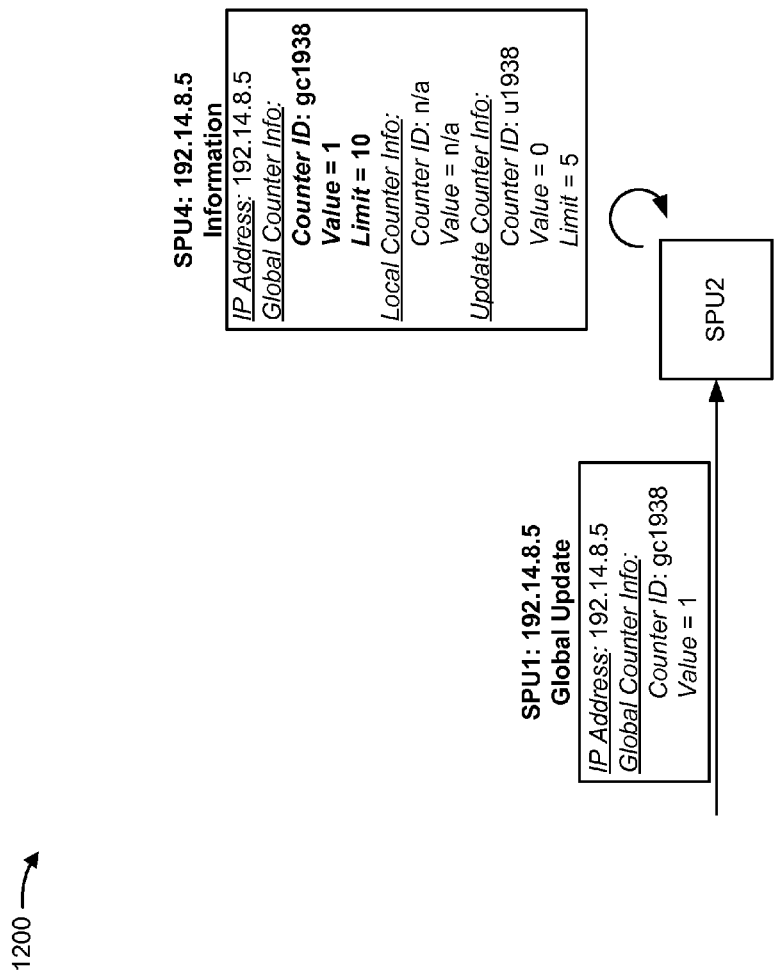

STATE SYNCHRONIZATION FOR GLOBAL CONTROL IN A DISTRIBUTED SECURITY SYSTEM

BACKGROUND

A distributed security system may include multiple processing units that perform different functions. For example, the distributed security system may include multiple security processing units (SPUs) that manage sessions for a packet flow, apply security features to a packet, and apply packet-based stateless firewall filters, classifiers, and traffic shapers to the packet. In some implementations, the distributed security system may use a processor as a central point to manage arbitration and allocation of resources and distribute sessions. This architecture allows processing of sessions to be distributed across multiple SPUs.

SUMMARY

According to some possible implementations, a method may comprise: receiving, by a first security processing unit (SPU) of a device, a packet associated with a request to create a session, the device including a plurality of SPUN; identifying, by the first SPU and based on information included in the packet, information associated with a global counter and information associated with an update counter associated with the global counter, the global counter being used to track a total quantity of sessions associated with the plurality of SPUs, the information associated with the global counter including a global counter identifier and a global counter value, and the information associated with the update counter including an update counter identifier and an update counter value; identifying, by the first SPU, a global limit associated with the global counter; determining, by the first SPU, that the global limit has not been reached based on the global counter value; causing, by the first SPU, the session to be created based on determining that the global limit has not been reached; modifying, by the first SPU and based on causing the session to be created, the global counter value to create a modified global counter value; modifying, by the first SPU and based on modifying the global counter value, the update counter value to create a modified update counter value; providing, by the first SPU and based on the modified update counter value, a local update message, the local update message being provided to a second SPU, of the plurality of SPUs, and including the global counter identifier and the modified global counter value, and the local update message causing the second SPU to provide a global update message associated with the global counter.

According to some possible implementations, a method may comprise: receiving, by a first security processing unit (SPU) of a device, a packet associated with a request to create a session, the device including a plurality SPUs, and the packet including a network address associated with creating the session; determining, by the first SPU and based on the network address included in the packet, that a global counter has not been assigned to the network address; causing, by the first SPU, the session to be created based on determining that a global counter has not been assigned; providing, by the first SPU and based on causing the session to be created, a local update message, the local update message being provided to a second SPU, of the plurality of SPUs, and including the network address and a particular counter identifier, and the local update message causing the second SPU to assign a global counter to the network address and provide a global update message, the global update message including updated information associated with the global counter, the updated information associated with the global counter including an updated global counter value and information identifying the network address.

According to some possible implementations, a device may comprise: a plurality of security processing units (SPUs) including a first SPU to: receive a request to create a session; identify, based on information included in the request, information associated with a global counter and information associated with an update counter corresponding to the global counter, the global counter being used to track a total quantity of sessions associated with the plurality of SPUs, the information associated with the global counter including a global counter identifier and a global counter value, and the information associated with the update counter including an update counter identifier and an update counter value; identify a global limit associated with the global counter; determine that the global limit has not been met based on the global counter value; cause the session to be created based on determining that the global limit has not been met; modify the global counter value to create a modified global counter value based on the session being created; modify the update counter value to create a modified update counter value; determine that a local update message is required based on the modified update counter value, the local update message including the global counter identifier and the modified global counter value; and provide the local update message to a second SPU, of the plurality of SPUs, to cause the second SPU to provide a global update message associated with the global counter.

BRIEF DESCRIPTION OF THE DRAWINGS

FIGS. 11A-11D are diagrams of an example implementation relating to the example processes shown in FIG. 8, FIG. 9, and FIG. 10; and FIGS. 12A-12C are diagrams of an additional example implementation relating to the example processes shown in FIG. 8, FIG. 9, and FIG. 10.

DETAILED DESCRIPTION OF THE PREFERRED EMBODIMENTS

The following detailed description of example implementations refers to the accompanying drawings. The same reference numbers in different drawings may identify the same or similar elements.

A distributed security system may include multiple security processing units (SPUs). The distributed security system may process packets by distributing the packets among the SPUs (e.g., when computing resources are split among the multiple SPUs). However, a particular SPU may be unable to share (e.g., among other SPUs) local state information (e.g., information known to the particular SPU, associated with a logical system session, a session associated with a network address, etc.) associated with the particular SPU. Since the particular SPU only has knowledge of local state information (e.g., associated with the particular SPU), global control among the SPUs (e.g., enforcement of a global logical system session limit, enforcement of a global network address session limit, etc.) may be difficult. Implementations described herein may allow for global control among multiple SPUs by allowing each of the multiple SPUs to provide a local update (e.g., that includes local state information) to a central SPU that is configured to provide a global update (e.g., that includes global state information) to the multiple SPUs.

Figure 1A:
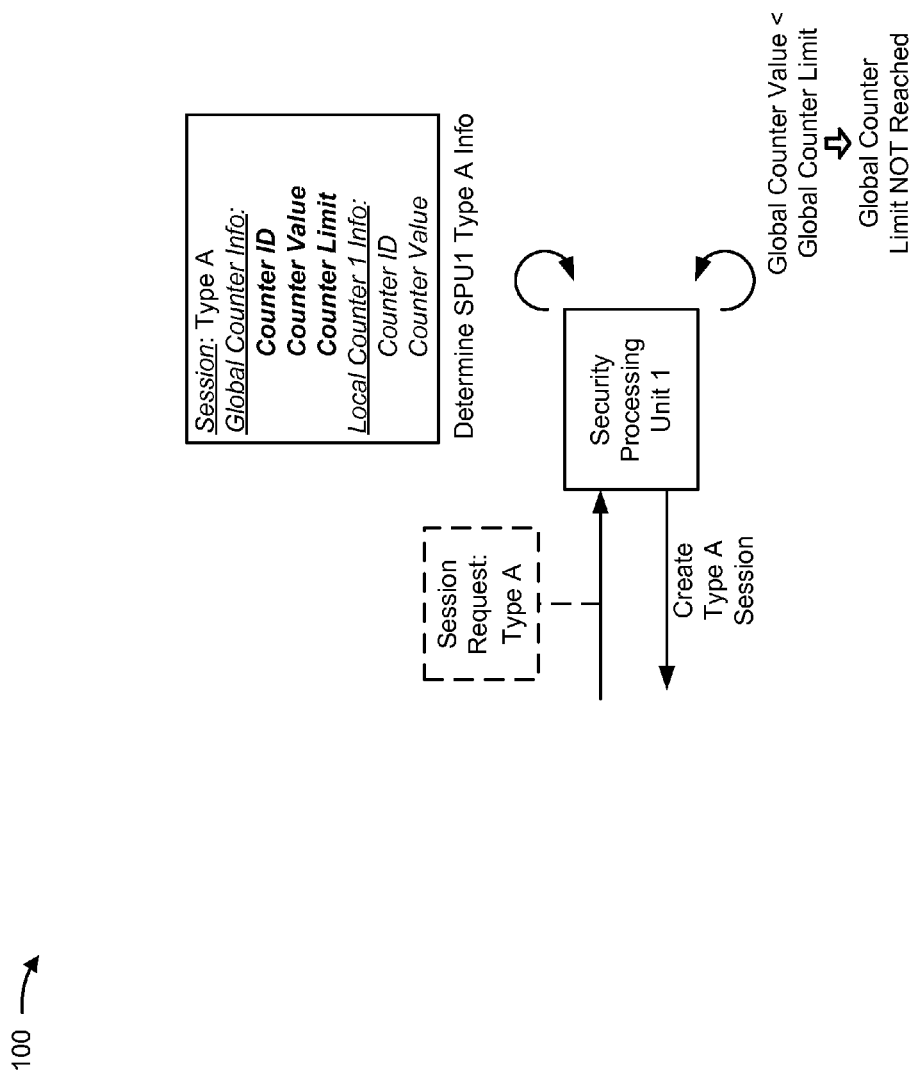
FIGS. 1A-1C are diagrams of an overview of an example implementation described herein.
Figure 1B:
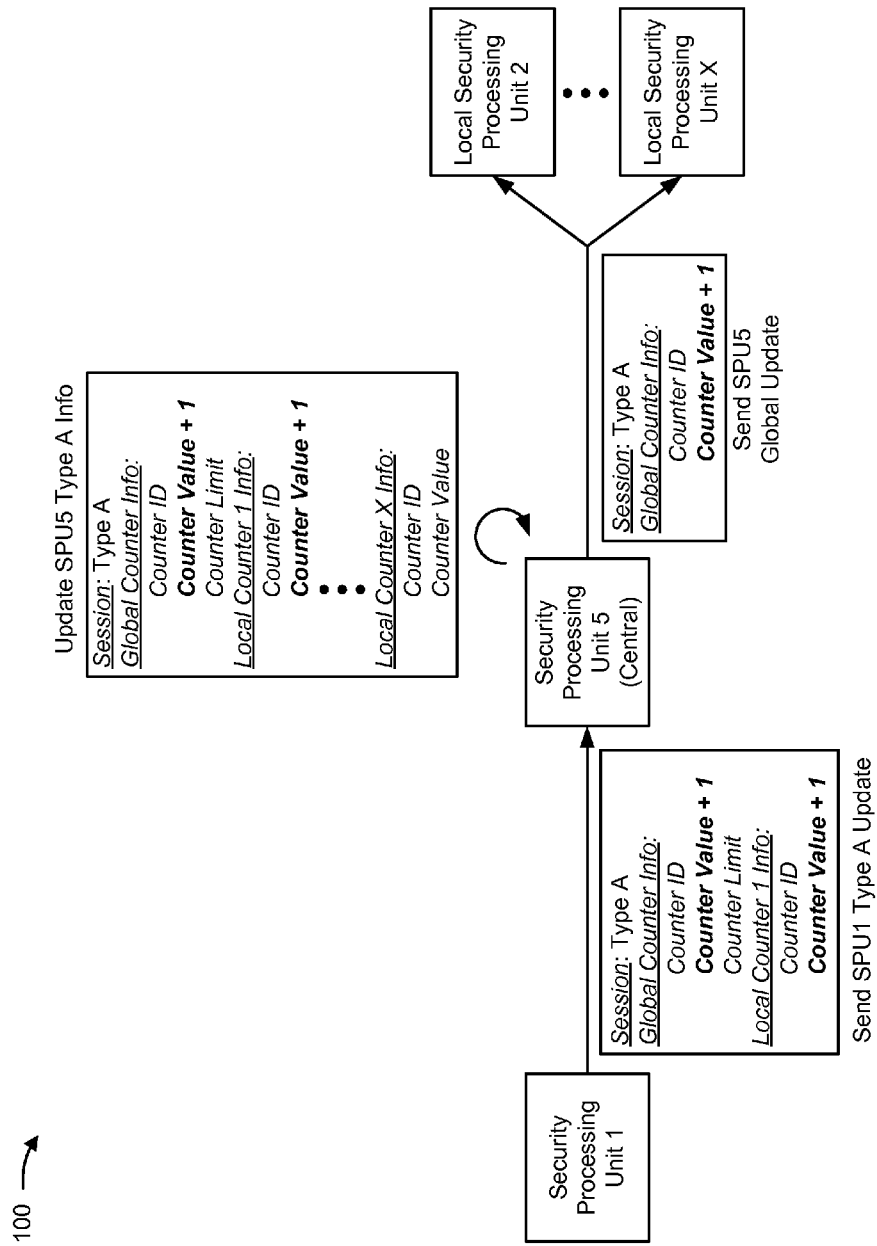
Figure 1C:
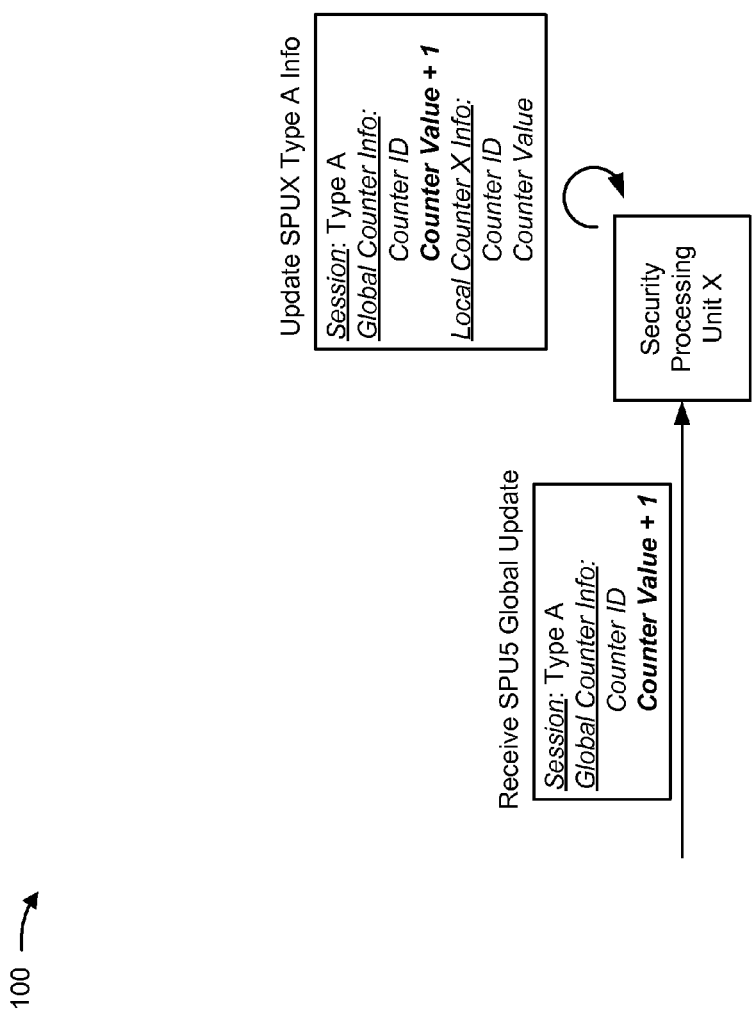

FIGS. 1A-1C are diagrams of an overview of an example implementation 100 described herein. For the purposes of example implementation 100, assume that a device, associated with implementing a distributed security system, includes multiple SPUs (e.g., SPU1 through SPUX), and that one of the multiple SPUs (e.g., SPU5) is configured to act as a central SPU by receiving local state information (e.g., local session information) from individual SPUs and providing global state information (e.g., global session information) to other SPUs. Finally, assume that each SPU stores information associated with a global counter (e.g., a static global counter, a dynamic global counter, etc.) that identifies a total quantity of state A sessions that are active across the multiple SPUs, and information associated with a local counter (e.g., a static local counter, a dynamic local counter, etc.) that identifies a quantity of state A sessions active via the individual SPU.

As shown in FIG. 1A, a first security processing unit, SPU1, may receive a packet associated with a request to initiate a state A session. As further shown, SPU1 may determine (e.g., based on information stored by SPU1), SPU1 (e.g., local) state A session information. As shown, the SPU1 state A session information may include information that identifies the session type (e.g., Session: State A), information associated with a global state A session counter (e.g., a global counter identifier, a global counter value, a global counter limit), and similar information associated with a local state A session counter (e.g., local counter 1). As further shown, SPU1 may determine that the global counter value (e.g., that indicates a total quantity of active state A sessions across SPU1 through SPUX) is less than the global counter limit (e.g., that indicates the maximum allowable quantity of state A sessions across SPU1 through SPUX), and may determine that the global counter limit has not been reached. As further shown, SPU1 may create the state A session based on determining that the global counter limit has not been reached.

As shown in FIG. 1B, assume that SPU1 modifies the SPU1 state A session information by increasing the global counter value by one and by increasing the local counter value by one. As further shown, SPU1 may send, to SPU5, a SPU1 state A session update message indicating that the session state A global counter is to be increased by one, and that the SPU1 local counter is to be increased by one. As shown, SPU5 may receive the update message, and may update SPU5 (e.g., global) state A session information, accordingly. As further shown, SPU5 may then generate and provide an SPU5 global update message to the other SPUs (e.g., SPU1 through SPUX). As shown, the message may indicate that the other SPUs (e.g., other than SPU1) are to increase global state A session counter values (e.g., stored by each of the other of SPUs) by one.

As shown in FIG. 1C, SPUX may receive the SPU5 global update message, and may increase a global state A session counter value, stored by SPUX, by one. Each of the other SPUs may also receive the SPU5 global update message and act in a similar manner.

In this way, global control among multiple SPUs may be achieved, since each of the multiple SPUs may provide a local update (e.g., that includes local state information) to a central SPU that is configured to provide a global update (e.g., that includes global state information) to the multiple SPUs.

Figure 2:
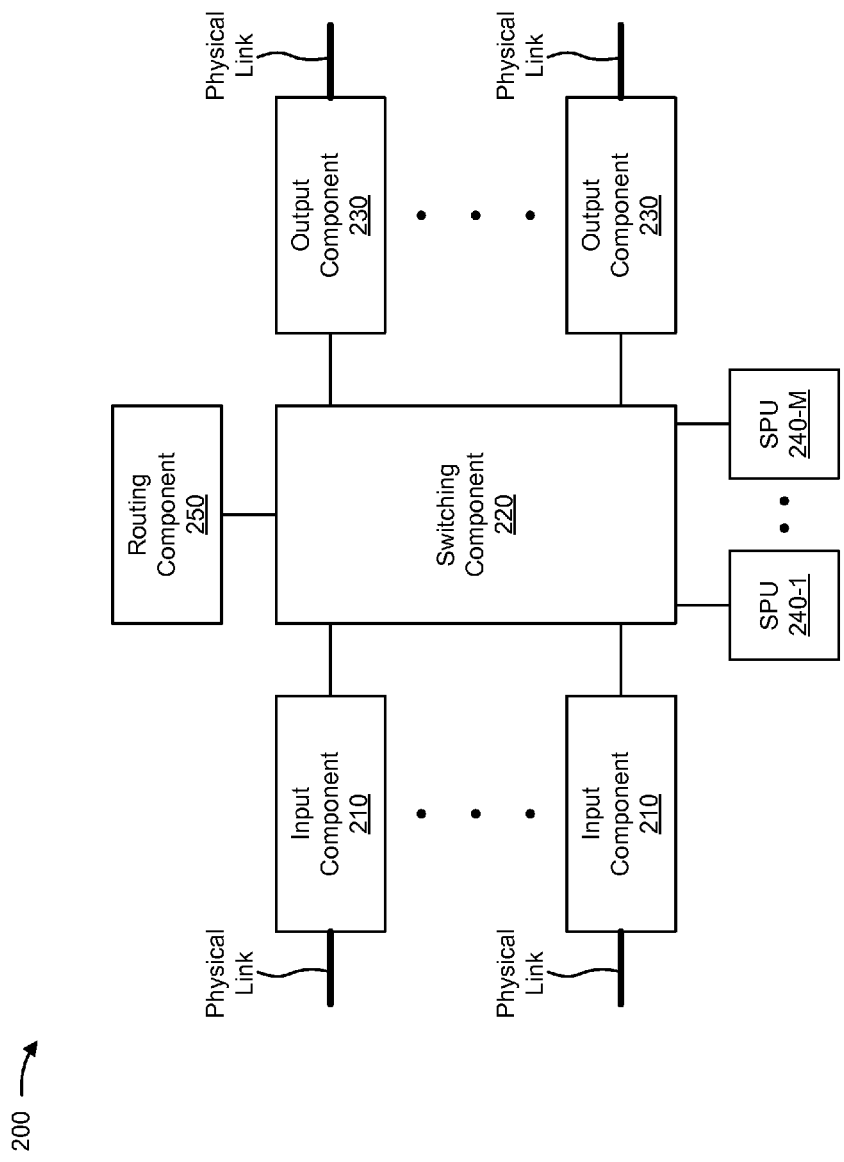
FIG. 2 is a diagram of an example device in which systems and/or methods, described herein, may be implemented.

FIG. 2 is a diagram of an example device 200 in which systems and/or methods described herein may be implemented. In some implementations, device 200 may include a network device, such as a gateway, a router, a switch, a firewall, a network interface card (NIC), a hub, a bridge, a proxy server, an optical add-drop multiplexer (OADM), or some other type of device that processes and/or transfers traffic. As illustrated, device 200 may include input components 210, a switching component 220, output components 230, security process units (SPUs) 240-1 through 240-M (collectively referred to herein as SPUs 240, and, in some instances, singularly as SPU 240), and a routing component 250.

Input components 210 may be points of attachment for physical links and may be points of entry for incoming traffic, such as packets. Input components 210 may process incoming traffic, such as by performing data link layer encapsulation or decapsulation. In some implementations, input components 310 may send and/or receive packets.

Switching component 220 may interconnect input components 210 with output components 230. Switching component 220 may be implemented using one or more of multiple, different techniques. For example, switching component 220 may be implemented via busses, via crossbars, and/or with shared memories. The shared memories may act as temporary buffers to store traffic from input components 210 before the traffic is eventually scheduled for delivery to output components 230. In some implementations, switching component 220 may enable input components 210, output components 230, SPUs 240, and/or routing component 250 to communicate. In some implementations, switching component 220 may distribute packets from input components 210 to SPUs 240 in order to provide load balancing among SPUs 240.

Output components 230 may store packets and may schedule packets for transmission on output physical links. Output components 230 may include scheduling algorithms that support priorities and guarantees. Output components 230 may support data link layer encapsulation or decapsulation, and/or a variety of higher-level protocols. In some implementations, output components 230 may send packets and/or receive packets.

SPU 240 may include one or more processors, microprocessors, application-specific integrated circuits (ASICs), field-programmable gate arrays (FPGAs), or similar types of processing components. In some implementations, SPU 240 may perform high level management functions for device 200, such as, for example, examining a packet received from input component 210, determining whether to perform an action (e.g., create a session), associated with the packet, and performing the action. In some implementations, SPU 240 may be capable of receiving, generating, processing, and/or providing local state information and/or global information associated with SPU 240. In some implementations, SPU 240 may act as a central processing unit that is to coordinate global control of a distributed security system associated with multiple other SPUs 240. In some implementations, SPUs 240 may be connected in a ring fashion.

Routing component 250 may include one or more processors, microprocessors, ASICs, FPGAs, or similar types of processing components. In some implementations, routing component 250 may communicate with other devices, networks, and/or systems connected to device 200 to exchange information regarding network topology. Routing component 250 may create routing tables based on the network topology information, create forwarding tables based on the routing tables, and forward the forwarding tables to input components 210 and/or output components 230. Input components 210 and/or output components 230 may use the forwarding tables to perform route lookups for incoming packets.

The number of components shown in FIG. 2 is provided for explanatory purposes. In practice, there may be additional components, fewer components, different components, or differently arranged components than those shown in FIG. 2. Furthermore, two or more of the components shown in FIG. 2 may be implemented within a single component, or a single component shown in FIG. 2 may be implemented as multiple, distributed components. Additionally, one or more of the components of environment 200 may perform one or more functions described as being performed by another one or more of the components of device 200.

Figure 3:
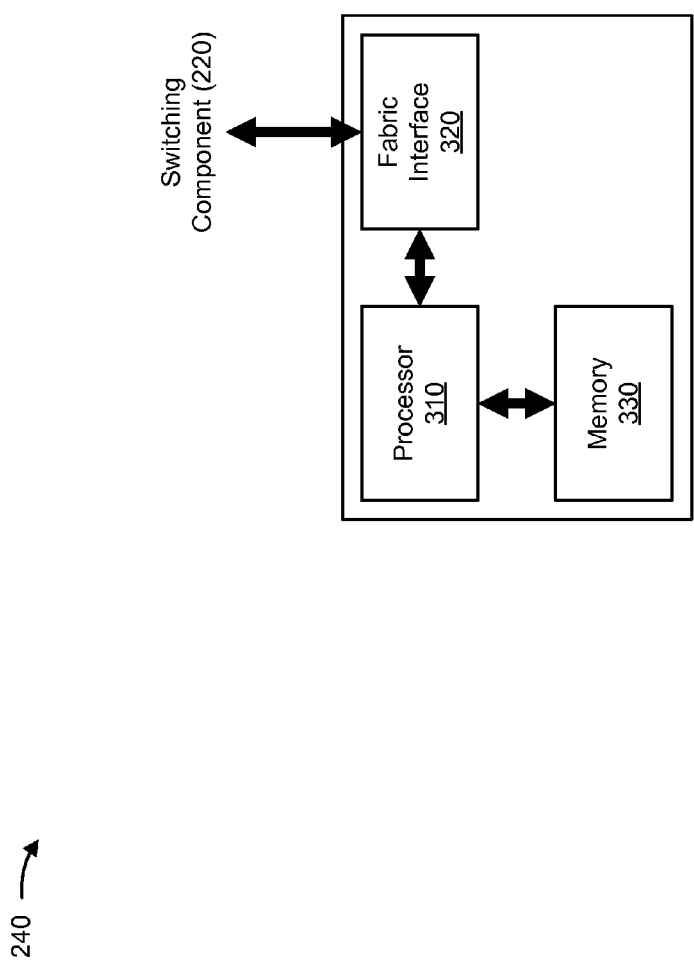
FIG. 3 is a diagram of example components of a security processing unit (SPU) shown in FIG. 2.

FIG. 3 is a diagram of example components of a SPU 240. As shown, SPU 240 may include a processor 310, a fabric interface 320, and a memory 330.

Processor 310 may include one or more processors, microprocessors, ASICs, FPGAs, or similar types of processing components. In some implementations, processor 310 may receive, store, process, and/or forward packets. For example, processor 210 may process packets received from input components 210, and may prepare packets for transmission on output components 230. In some implementations, processor 310 may perform certain services on incoming packets.

Fabric interface 320 may include any transceiver-like component that enables SPU 240 to communicate with other devices and/or systems, such as switching component 220 of device 200. In some implementations, fabric interface 320 may include one or more buffers for temporarily storing augmented packets (e.g., packets pre-pended with additional header information) received from processor 310. The buffers may prevent the packets from being dropped if a bottleneck (e.g., a processing delay) develops during packet transport.

Memory 330 may include a random access memory (RAM), a read only memory (ROM), and/or another type of dynamic or static storage component (e.g., a flash, magnetic, or optical memory) that stores information and/or instructions for use by processor 310. In some implementations, memory 330 may temporarily store incoming traffic (e.g., a header of a packet or an entire packet) from input components 210, for processing by processor 310, before a packet is directed back to switching component 220, transported by switching component 220, and/or eventually scheduled to be sent to output components 230.

In some implementations, memory 330 may store information associated with a counter (e.g., a global counter, a local counter, an update counter, etc.) associated with implementing global control among multiple SPUs 240. Additionally, or alternatively, memory 330 may store information associated with a counter limit associated with the counter (e.g., a global counter limit, a local counter limit, an update counter limit, etc.).

SPU 240 may perform various operations described herein. SPU 240 may perform these operations in response to processor 310 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via a communication interface. When executed, software instructions stored in memory 330 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, SPU 240 may include additional components, fewer components, different components, or differently arranged components than those shown in FIG. 3. Additionally, or alternatively, one or more components of SPU 240 may perform one or more functions described as being performed by another one or more components of SPU 240.

Figure 4:
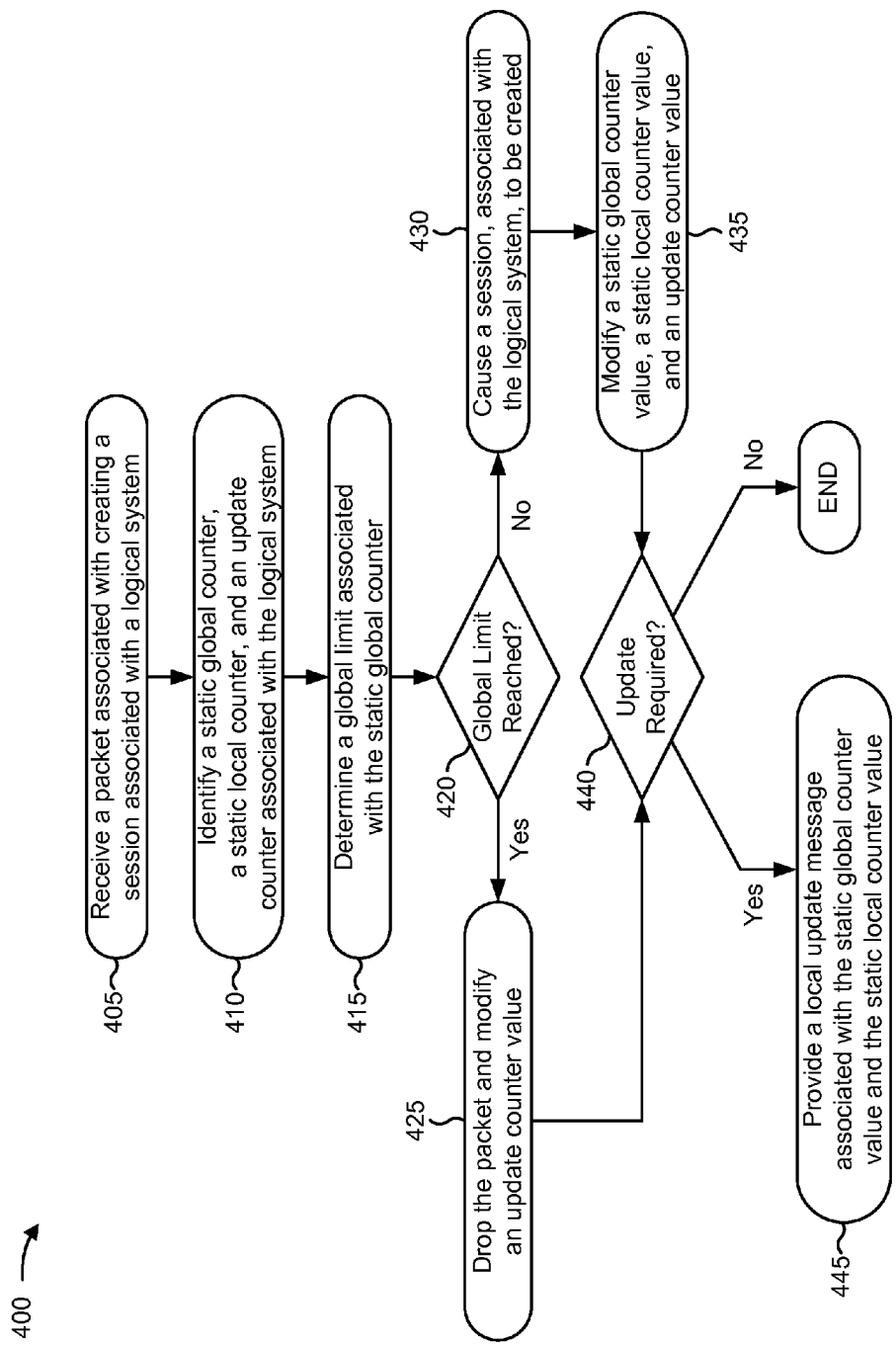
FIG. 4 is a flow chart of an example process for identifying a static global counter, associated with creating a session, determining whether the session may be created, and providing a local update message associated with the static global counter.
Figure 5:
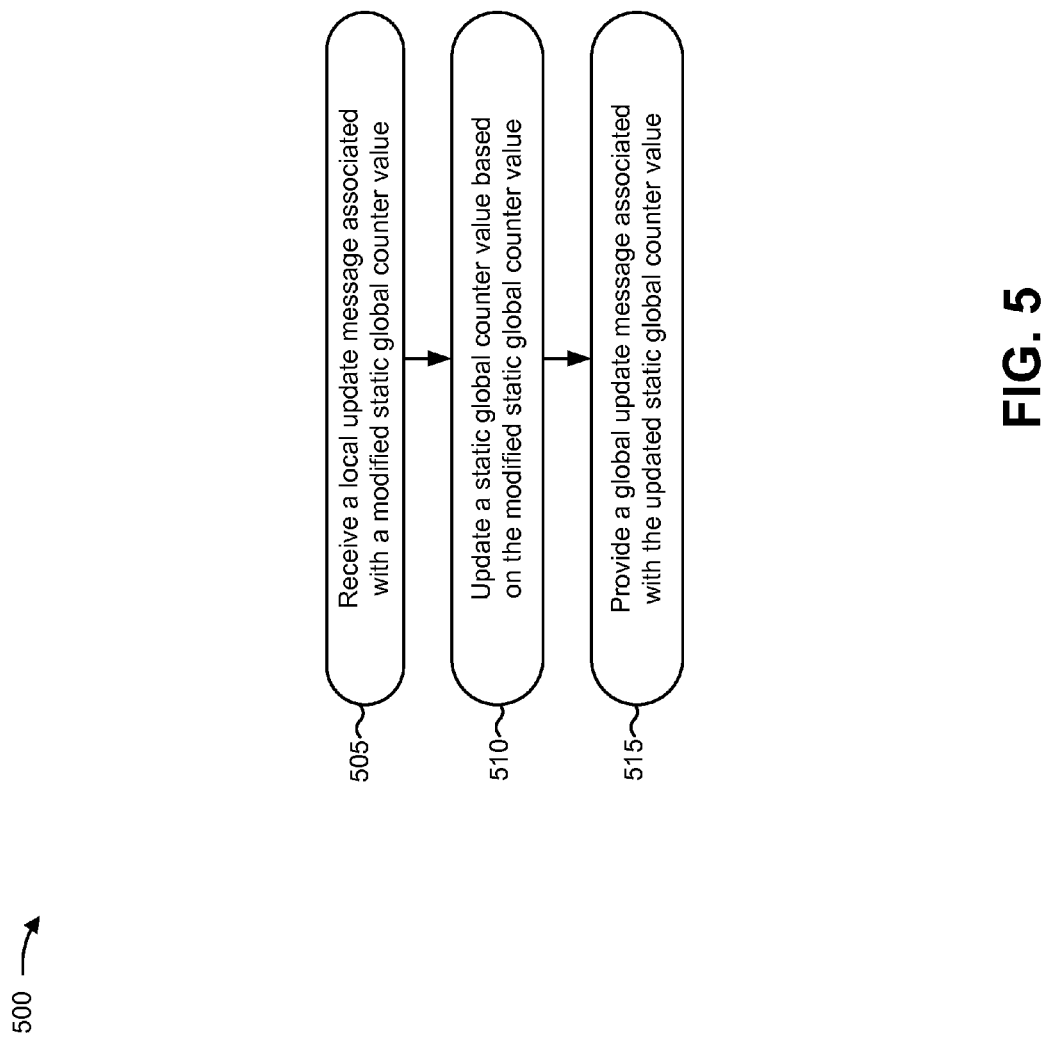
FIG. 5 is a flow chart of an example process for receiving a local update message, associated with a static global counter, and providing a global update message associated with the static global counter.
Figure 6:
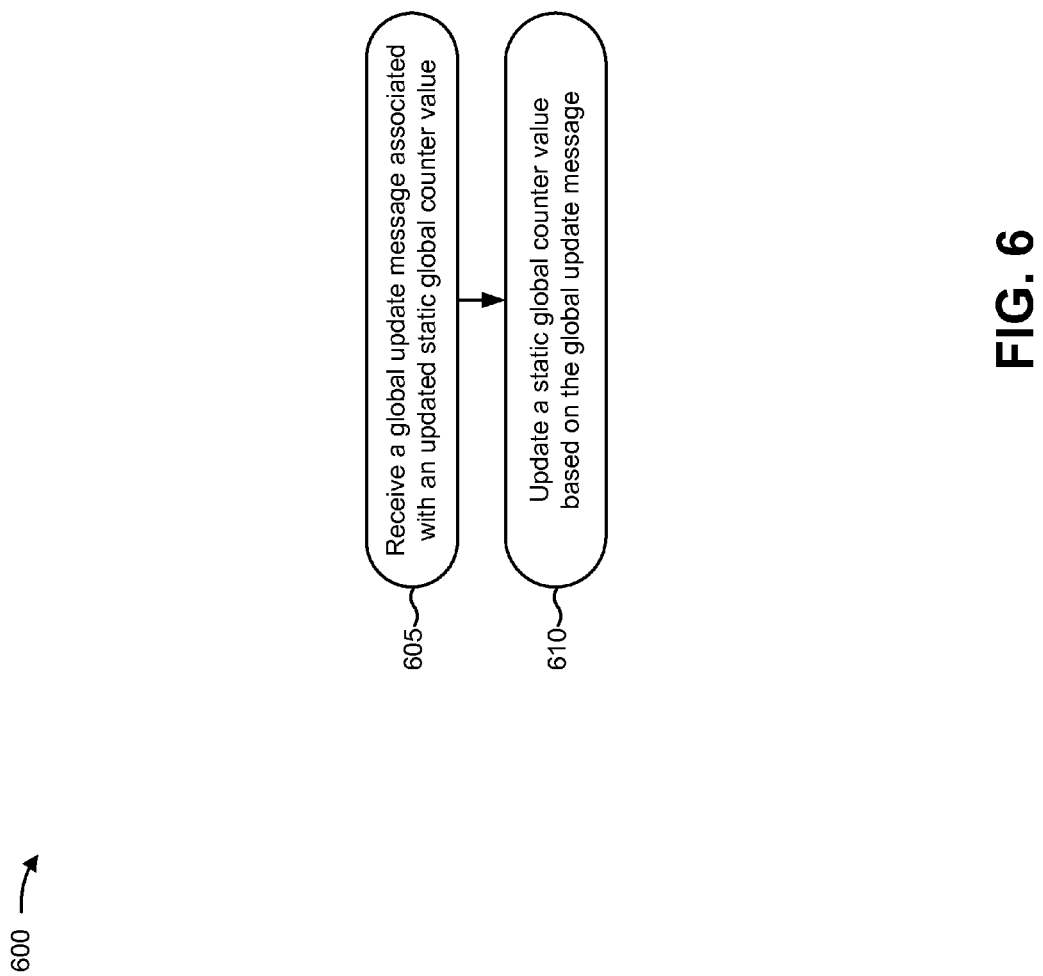
FIG. 6 is a flow chart of an example process for receiving a global update message, associated with a static global counter, and updating information associated with the static global counter based on the local update message.

FIG. 4 is a flow chart of an example process 400 for identifying a static global counter, associated with creating a session, determining whether the session may be created, and providing a local update message associated with the static global counter. In some implementations, one or more process blocks of FIG. 4 may be performed by device 200 (e.g., a first SPU 240 included in device 200). In some implementations, one or more process blocks of FIG. 4 may be performed by another device or a group of devices separate from or including device 200. As described below, FIG. 4, FIG. 5, and FIG. 6 are discussed in terms of sessions, associated with logical systems, that implement static counters. However, the systems and/or methods described with regard to FIG. 4, FIG. 5, and FIG. 6 may equally be applied to types of state information that implement static counters (e.g., other than sessions associated with logical systems).

As shown in FIG. 4, process 400 may include receiving a packet associated with creating a session associated with a logical system (block 405). For example, SPU 240 may receive a packet associated with creating a session associated with a logical system. In some implementations, SPU 240 may receive the packet when the packet is provided via another component of device 200, such as input component 210 and/or switching component 220. For example, switching component 220 may receive the packet, via input component 210, and may forward the packet to SPU 240.

In some implementations, the packet may include information indicating that SPU 240 is to create a session, associated with a logical system managed by device 200, between device 200 and another device (e.g., a user device, a server device, etc.). For example, device 200 may support multiple logical systems (e.g., to allow for traffic separation, administrative separation, logging separation, resource separation, etc.), and a user device may wish to communicate with device 200 via a logical system session between the user device and device 200.

In some implementations, the packet may include information that identifies a logical system associated with the session request. For example, the session request may include a logical system name, a logical system identifier, a logical system identification number, etc. that identifies the logical system associated with the session request.

As further shown in FIG. 4, process 400 may include identifying a static global counter, a static local counter, and an update counter associated with the logical system (block 410). For example, SPU 240 may identify a static global counter, a static local counter, and an update counter associated with the logical system. In some implementations, SPU 240 may identify the static global counter, the static local counter, and the update counter when SPU 240 receives the packet associated with creating the session (e.g., after SPU 240 receives the packet).

A static global counter may include a counter associated with tracking a total quantity of active sessions, associated with a logical system, across all SPUs 240 included in device 200. For example, if device 200 includes ten SPUs 240, then the static global counter for device 200 may be associated with tracking the total number of active sessions, associated with the logical system, across the ten SPUs 240. In some implementations, the static global counter may consistently be associated with the same logical system. For example, a particular static global counter (e.g., GlsysA) may always be associated with a global session count for a particular logical system (e.g., logical system A). In some implementations, the static global counter may be identified by a static global counter identifier, such as a string of characters, a static global counter identification number, or the like. Additionally, or alternatively, the static global counter may include a static global counter value that may be increased and/or decreased as sessions, associated with the logical system, are created and/or terminated, as discussed below.

A static local counter may include a counter associated with tracking a total quantity of active sessions, associated with a logical system, for a particular SPU. For example, if a particular SPU 240 included in device 200 is currently managing two sessions associated with a logical system, then the static local counter may be used to indicate that the particular SPU 240 is managing the two sessions. In some implementations, the static local counter may consistently be associated with the same logical system and a particular SPU 240. For example, a particular static local counter (e.g., S2lsysA) may always be associated with a local session count for a particular logical system (e.g., logical system A) managed by a particular SPU 240 (e.g., SPU2). In some implementations, the static local counter may be identified by a static local counter identifier, such as a string of characters, a static local counter identification number, or the like. Additionally, or alternatively, the static local counter may include a static local counter value that may be modified as sessions, associated with the logical system, are created and/or terminated, as discussed below.

An update counter may include a counter associated with providing a local update (e.g., an update associated with the static global counter and/or the static local counter) to a central SPU 240. For example, an update counter, associated with a particular SPU 240, may indicate that the particular SPU 240 is to provide an update message to a central SPU 240 when an update counter value, associated with the update counter, reaches an update counter threshold, as discussed below. In some implementations, the update counter value may be modified each time a session is created and/or terminated, as discussed below.

In some implementations, SPU 240 may identify the static global counter, the static local counter, and the update counter based on information included in the packet. For example, the packet may include information that identifies the logical system (e.g., a logical system name, a logical system identification number, etc.), and SPU 240 may identify the global static counter, the local static counter, and the update counter based on information (e.g., stored by SPU 240) that identifies the global static counter, the local static counter, and the update counter that correspond to the logical system identified in the packet.

As further shown in FIG. 4, process 400 may include determining a global limit associated with the static global counter (block 415). For example, SPU 240 may determine a global limit associated with the static global counter. In some implementations, SPU 240 may determine the global limit when SPU 240 identifies the static global counter, the static local counter, and the update counter associated with the logical system (e.g., after SPU 240 identifies the static global counter, the static local counter, and the update counter).

A global limit may include information that identifies a maximum total quantity of active sessions, associated with a global counter (e.g., a static global counter or a dynamic global counter), that may be active across all SPUs 240 at any given time. For example, the global limit may indicate that ten sessions, associated with a static global counter associated with a logical system, may be active at any given time across all SPUs 240 included in device 200. In some implementations, SPU 240 (e.g., device 200) may receive (e.g., based on information provided by an administrator) and store information associated with the global limit, such as the maximum total quantity of active sessions, information that identifies the logical system associated with the global limit, or the like.

In some implementations, SPU 240 may determine the global limit based on the information that identifies the logical system. For example, SPU 240 may receive a packet that includes information that identifies the logical system, and SPU 240 may determine the global limit, associated with the logical system identified in the packet, based on information stored by SPU 240. Additionally, or alternatively, SPU 240 may determine the global limit based on information that identifies the global counter.

As further shown in FIG. 4, process 400 may include determining whether the global limit has been reached (block 420). For example, SPU 240 may determine whether the global limit has been reached. In some implementations, SPU 240 may determine whether the global limit has been reached when SPU 240 determines the global limit associated with the static global counter (e.g., after SPU 240 determines the global limit).

In some implementations, SPU 240 may determine whether the global limit has been reached based on the static global counter and the global limit. For example, SPU 240 may determine that a static global counter value, associated with the static global counter, indicates that a first quantity of sessions, associated with the logical system, are active across all SPUs 240, may determine that the global limit, associated with the logical system, indicates that a second quantity of sessions are permitted, and may compare the first quantity of sessions and the second quantity of sessions. In this example, if the first quantity of sessions is less than the second quantity of sessions, then SPU 240 may determine that the global limit has not been reached. Conversely, if the first quantity of sessions is greater than or equal to the second quantity of sessions, then SPU 240 may determine that the global limit has been reached.

As further shown in FIG. 4, if the global limit has been reached (block 420—YES), then process 400 may include dropping the packet and modifying an update counter value (block 425). For example, SPU 240 may determine that the global limit has been reached, and SPU 240 may drop the packet and may modify an update counter value associated with the update counter.

In some implementations, SPU 240 may drop the packet such that a session, associated with the logical system, is not created. For example, if the global limit has been reached, then no additional sessions, associated with the logical system, may be created (e.g., via any SPUs 240), and SPU 240 may drop the packet without creating a session associated with the logical system.

Additionally, or alternatively, SPU 240 may modify the update counter value by increasing the update counter value from a first value (e.g., 4) to a second value (e.g., 5). Alternatively, SPU 240 may modify the update counter value by decreasing the update counter value from a first value (e.g., 3) to a second value (e.g., 2). In some implementations, SPU 240 may provide a local update message when the modified update counter is reaches an update threshold, as discussed below.

In some implementations, SPU 240 may drop the packet, modify the update counter, and may proceed to block 440 to determine whether a local update message, associated with the logical system, is required, as discussed below with regard to block 440.

As further shown in FIG. 4, if the global limit has not been reached (block 420—NO), then process 400 may include causing a session, associated with the logical system, to be created (block 430). For example, SPU 240 may determine that the global limit has not been reached, and SPU 240 may cause a session, associated with the logical system and the device associated with the session request, to be created.

As further shown in FIG. 4, process 400 may include modifying a static global counter value, a static local counter value, and an update counter value (block 435). For example, SPU 240 may modify a static global counter value (e.g., associated with the static global counter), a static local counter value (e.g., associated with the static local counter), and an update counter value (e.g., associated with the update counter). In some implementations, SPU 240 may modify the static global counter value, the static local counter value, and the update counter value when SPU 240 causes the session, associated with the logical system, to be created.

In some implementations, SPU 240 may modify the static global counter value by increasing the static global counter value from a first value (e.g., 9) to a second value (e.g., 10). Similarly, SPU 240 may modify the static local counter value by increasing the static local counter value from a third value to a fourth value. In some implementations, SPU 240 may modify the update counter value by increasing the update counter value or decreasing the update counter value, as discussed above.

As further shown in FIG. 4, process 400 may include determining whether a local update message is required based on modifying the update counter value (block 440). For example, SPU 240 may determine whether a local update message, associated with the logical system, is required based on modifying the update counter value. In some implementations, SPU 240 may determine whether the local update message is required when SPU 240 modifies the static global counter value, the static local counter value, and the update counter value, as discussed with regard to block 435. Additionally, or alternatively, SPU 240 may determine whether the local update message is required when SPU 240 drops the packet and modifies the update counter value, as discussed with regard to block 425.

In some implementations, SPU 240 may determine whether the local update message is required based on an update counter threshold and the modified update counter value. For example, SPU 240 may store information that identifies an update counter threshold (e.g., 10, etc.), and SPU 240 may compare the update counter threshold to the update counter value (e.g., modified by SPU 240 in block 425 or block 435). In this example, if the modified update counter value satisfies the update counter threshold (e.g., the modified update counter is equal to the update counter threshold), then SPU 240 may determine that a local message update is required (e.g., and SPU 240 may reset the update counter). Conversely, if the modified update counter value does not satisfy the update counter threshold (e.g., the modified update counter value is greater than the update counter threshold or the modified update counter value is less than the update counter threshold), then SPU 240 may determine that a local update message is not required.

Additionally, or alternatively, SPU 240 may determine whether the local update message is required based on a threshold amount of time. For example, SPU 240 may implement a timer to track an amount of time since SPU 240 has received a packet associated with creating a session associated with a logical system (e.g., an amount of time since the last packet was received). In this example, if the amount of time since SPU 240 has received a packet satisfies the threshold amount of time, then SPU 240 may determine that SPU 240 a local update message is required (e.g., SPU 240 may determine that a local update message is required after a period of inactivity).

As further shown in FIG. 4, if a local update message is required (block 440—YES), then process 400 may include providing a local update message associated with the modified static global counter value and the modified static local counter value (block 445). For example, SPU 240 may determine that a local update message is required, and SPU 240 may provide a local update message associated with the modified static global counter value and the modified static local counter value.

A local update message may include a message that includes information associated with the modified static global counter value and the modified static local counter value. In some implementations, the local update message may include information that identifies the logical system, information that identifies the static global counter, the modified static global counter value, information that identifies the static local counter, the modified static local counter, and/or other information.

In some implementations, SPU 240 may provide the local update message to a central SPU 240 (e.g., a particular SPU 240 that is configured to manage the distribution of global information associated with the logical system) via one or more other components of device 200.

As further shown in FIG. 4, if a local update message is not required (block 440—NO), then process 400 may include ending process 400. For example, SPU 240 may determine that a local update message is not required, and SPU 240 may wait to receive another packet associated with a request associated with the logical system. As such, SPU 240 may be configured to not provide a local update message following every modification to the static global counter value and the static local counter value (e.g., in order to minimize communication between SPUs 240 included in device 200).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

FIG. 5 is a flow chart of an example process 500 for receiving a local update message, associated with a static global counter, and providing a global update message associated with the static global counter. In some implementations, one or more process blocks of FIG. 5 may be performed by device 200 (e.g., SPU 240). In some implementations, one or more process blocks of FIG. 5 may be performed by another device or a group of devices separate from or including device 200.

As shown in FIG. 5, process 500 may include receiving a local update message associated with a modified static global counter value (block 505). For example, a central SPU 240 may receive a local update message associated with a modified static global counter value. In some implementations, the central SPU 240 may receive the local update message when another SPU 240 provides the local update message (e.g., via one or more other components of device 200).

A central SPU 240 may include an SPU 240 that is configured to manage the distribution of global information associated with a global counter (e.g., a static global counter, a dynamic global counter, etc.). In some implementations, a particular SPU 240 may be configured to manage distribution of global information associated with multiple global counters (e.g., a single SPU 240 may act as a central SPU for multiple static global counters corresponding to multiple logical systems and/or may act as a central SPU for multiple dynamic global counters). Additionally, or alternatively, a first SPU 240 may be configured to manage distribution of global information associated with a first global counter, a second SPU 240 may be configured to manage distribution of global information associated with a second global counter, etc. (e.g., multiple SPUs may act as a central SPU 240 for corresponding global counters).

In some implementations, the local update message may include information (e.g., a counter identifier, a modified counter value, etc.) associated with a static global counter and a static local counter, as discussed above. In some implementations, the local update message may include a modified static global counter value that corresponds to a static global counter value stored by the central SPU 240 (e.g., the modified static global counter value may be an up to date version of the static global counter value stored by the central SPU 240).

As further shown in FIG. 5, process 500 may include updating a static global counter value based on the modified static global counter value (block 510). For example, the central SPU 240 may update a static local counter value, stored by the central SPU 240, based on the modified static global counter value included in the local update message. In some implementations, the central SPU 240 may update the static global counter value when the central SPU 240 receives the local update message (e.g., after the central SPU 240 receives the local update message).

In some implementations, the central SPU 240 may update the static global counter value, stored by the central SPU 240, that corresponds to the static global counter identified in the local update message. For example, the central SPU 240 may store information associated with a static global counter (e.g., a counter identifier, a first counter value), and another SPU 240 may provide, to the central SPU 240, a local update message that includes modified information associated with the static global counter (e.g., the counter identifier, a second counter value). In this example, the central SPU 240 may update the static global counter value, associated with the static global counter identified in the local update message, such that the counter value, stored by the central SPU 240 is the second counter value (e.g., rather than the first counter value). In this way, the central SPU 240 may receive modified static global counter information from other SPUs 240, and may update a static global counter value, accordingly.

In some implementations, the central SPU 240 may update a static local counter value, stored by the central SPU 240, in a similar manner. In this way, the central SPU 240 may store information that identifies a quantity of sessions, associated with the logical system, that are being managed by each of the SPUs 240 included in device 200.

As further shown in FIG. 5, process 500 may include providing a global update message associated with the updated static global counter value (block 515). For example, the central SPU 240 may provide a global update message associated with the updated static global counter value. In some implementations, the central SPU 240 may provide the global update message when the central SPU 240 updates the static global counter value stored by the central SPU 240 (e.g., after the central SPU 240 updates the static global counter value).

A global update message may include a message that includes information associated with the updated global counter value (e.g., an updated static global counter value, an updated dynamic global counter value, etc.) stored by the central SPU 240. In some implementations, the global update message may include information that identifies the logical system associated with the static global counter, information that identifies the static global counter, the updated static global counter value, and/or other information. In some implementations, the central SPU 240 may generate the global update message.

In some implementations the central SPU 240 may provide the global update message to other SPUs 240 included in device 200. For example, the central SPU 240 may provide the global update message to each of the other SPUs 240 included in device 200 (e.g., including the particular SPU 240 that provided the local update message to the central SPU 240). In some implementations, the central SPU 240 may provide the global update message via one or more other components of device 200.

Although FIG. 5 shows example blocks of process 500, in some implementations, process 500 may include additional blocks, different blocks, fewer blocks, or differently arranged blocks than those depicted in FIG. 5. Additionally, or alternatively, one or more of the blocks of process 500 may be performed in parallel.

FIG. 6 is a flow chart of an example process 600 for receiving a global update message, associated with a static global counter, and updating information associated with the static global counter based on the local update message. In some implementations, one or more process blocks of FIG. 6 may be performed by device 200 (e.g., SPU 240). In some implementations, one or more process blocks of FIG. 6 may be performed by another device or a group of devices separate from or including device 200.

As shown in FIG. 6, process 600 may include receiving a global update message associated with an updated static global counter value (block 605). For example, SPU 240 may receive a global update message associated with an updated static global counter value. In some implementations, SPU 240 may receive the global update message when a central SPU 240 provides the update message (e.g., after the central SPU 240 updates the static global counter value stored by the central SPU 240).

In some implementations, the global update message may include information (e.g., a counter identifier, an updated counter value, etc.) associated with an updated static global counter value that has been updated by the central SPU 240 based on a modification by another SPU 240, as discussed above. In some implementations, the global update message may include an updated static global counter value that corresponds to a static global counter stored value by SPU 240 (e.g., the updated static global counter value may be an updated version of the static global counter value stored by 240).

As further shown in FIG. 6, process 600 may include updating a static global counter value based on the global update message (block 610). For example, SPU 240 may update a static local counter value, stored by SPU 240 and associated with the static global counter, based on the updated static global counter value included in the global update message. In some implementations, SPU 240 may update the static global counter value when SPU 240 receives the global update message (e.g., after the central SPU 240 provides the global update message).

In some implementations, SPU 240 may update the static global counter value, stored by the SPU 240, to correspond to the updated static global counter value included in the global update message. For example, SPU 240 may store information associated with a static global counter (e.g., a counter identifier, a first counter value), and the central SPU 240 may provide, to SPU 240, a global update message that includes updated information associated with the static global (e.g., the counter identifier, a second counter value). In this example, SPU 240 may update the counter value, associated with the counter identified by the counter identifier, such that the counter value, stored by SPU 240 is equal to the second counter value (e.g., rather than the first counter value). In this way, SPU 240 may receive updated static global counter information from the central SPU 240, and may update a static global counter, accordingly.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

FIGS. 7A-7D are diagrams of an example implementation 700 relating to example process 400, 500, and 600 shown in FIG. 4, FIG. 5, and FIG. 6, respectively. For the purposes of example implementation 700, assume that an SPU (e.g., SPU2) is capable of creating and managing a session associated with a logical system (e.g., lsysA).

Figure 7A:
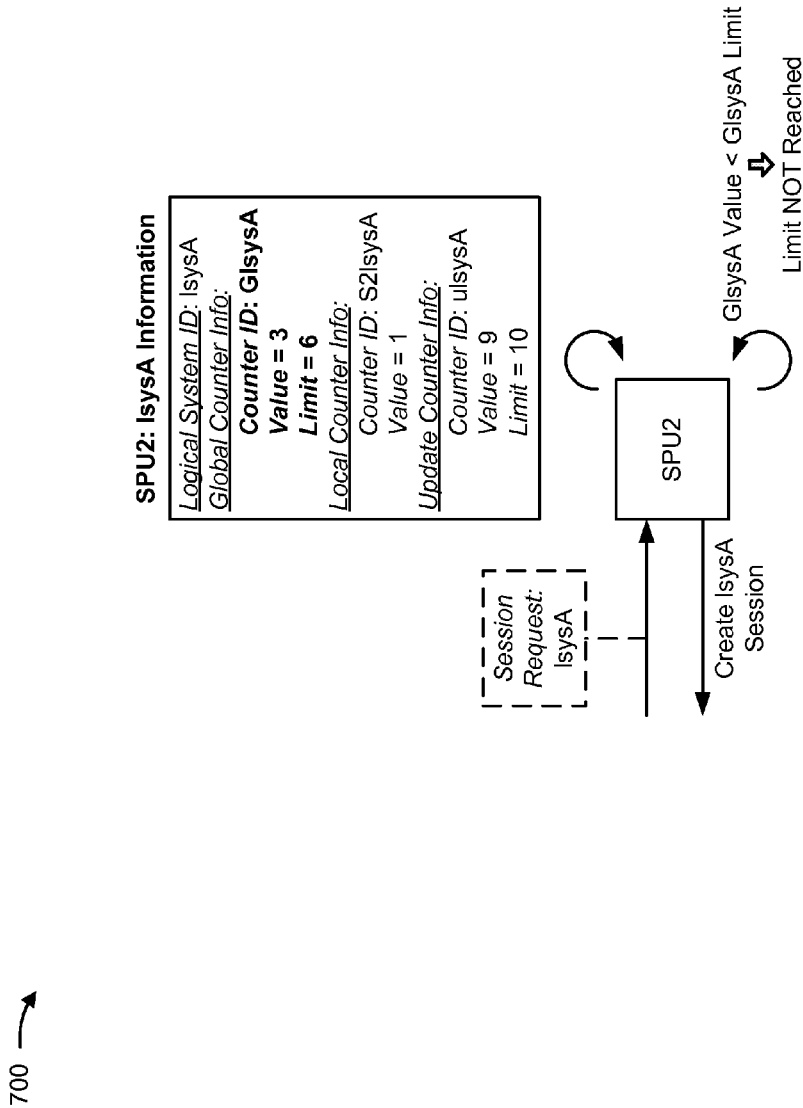
FIGS. 7A-7D are diagrams of an example implementation relating to the example processes shown in FIG. 4, FIG. 5, and FIG. 6.

As shown in FIG. 7A, assume that SPU2 stores information that identifies a static global counter associated with lsysA (e.g., GlsysA), a current counter value associated with GlsysA (e.g., Value=3), and a counter limit (e.g., Limit=6), associated with GlsysA, that indicates a global limit associated with lsysA. Also, assume that SPU2 stores information that identifies a static local counter associated with lsysA (e.g., S2lsysA) and a current counter value associated with S2lsysA (e.g., Value=1). Finally, assume that SPU2 stores information that identifies an update counter associated with lsysA (e.g., ulsysA), a current counter value associated with ulsysA (e.g., Value=9), and a counter limit (e.g., Limit=10), associated with ulsysA, that indicates an update counter threshold associated with lsysA.

As shown in FIG. 7A, SPU2 may receive (e.g., via switching component 220) a request to create a session associated with lsysA. As shown, SPU2 may determine (e.g., based on the information stored by SPU2) the lsysA counter information stored by SPU2. As shown, the lsysA counter information may include the information associated with the static global counter, the static local counter, and the update counter, as described above.

As further shown, SPU2 may determine that the value of the GlsysA counter (e.g., 3) is less than the global limit of the GlsysA counter (e.g., 6), SPU2 may determine that the global limit, associated with lsysA, has not been reached, and SPU2 may create the session associated with lsysA.

Figure 7B:
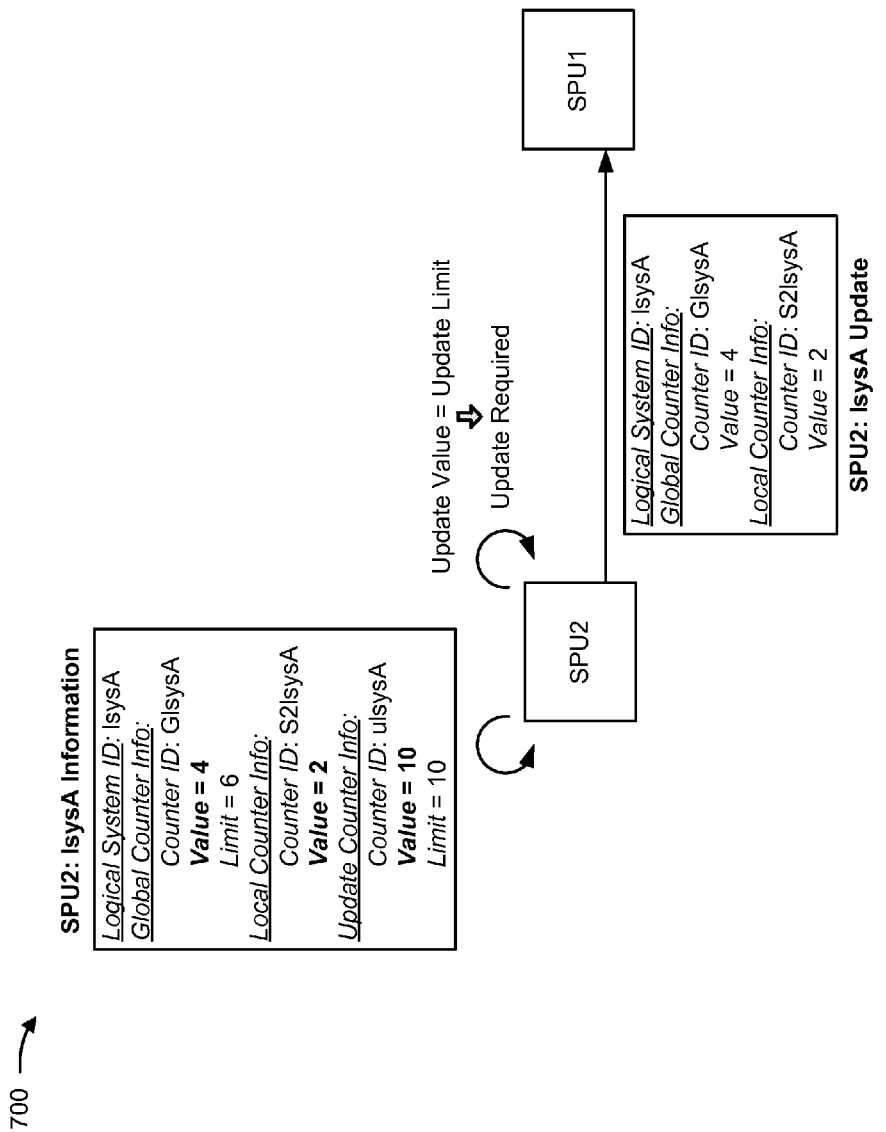

As shown in FIG. 7B, SPU2 may modify the static global counter value, the static local counter value, and the update counter value based on determining that the global limit, associated with lsysA, has not been reached. As shown, SPU2 may modify the GlsysA counter value by increasing the value by one (e.g., from 3 to 4), may modify the S2lsysA counter value by increasing the value by one (e.g., from 1 to 2), and may modify the ulsysA counter value by increasing the value by one (e.g., from 9 to 10).

As further shown, SPU 2 may determine whether a local update message, associated with lsysA, is required. As shown, SPU2 may determine that the ulsysA counter value satisfies the update counter threshold indicated by the ulsysA counter limit (e.g., since the ulsysA counter value and the ulsysA counter limit value both equal 10), and SPU2 may determine that a local update message, associated with lsysA, is required.

As further shown in FIG. 7B, SPU2 may generate and provide a local update message associated with lsysA. As shown, the local update message may include information identifying lsysA, information identifying the GlsysA counter, the modified GlsysA counter value, information identifying the S2lsysA counter, and the modified S2lsysA counter value. As shown, assume that another SPU, SPU1, is configured to act as a central SPU for distributing global information associated with lsysA. As shown, SPU2 may provide the local update message to SPU1.

Figure 7C:
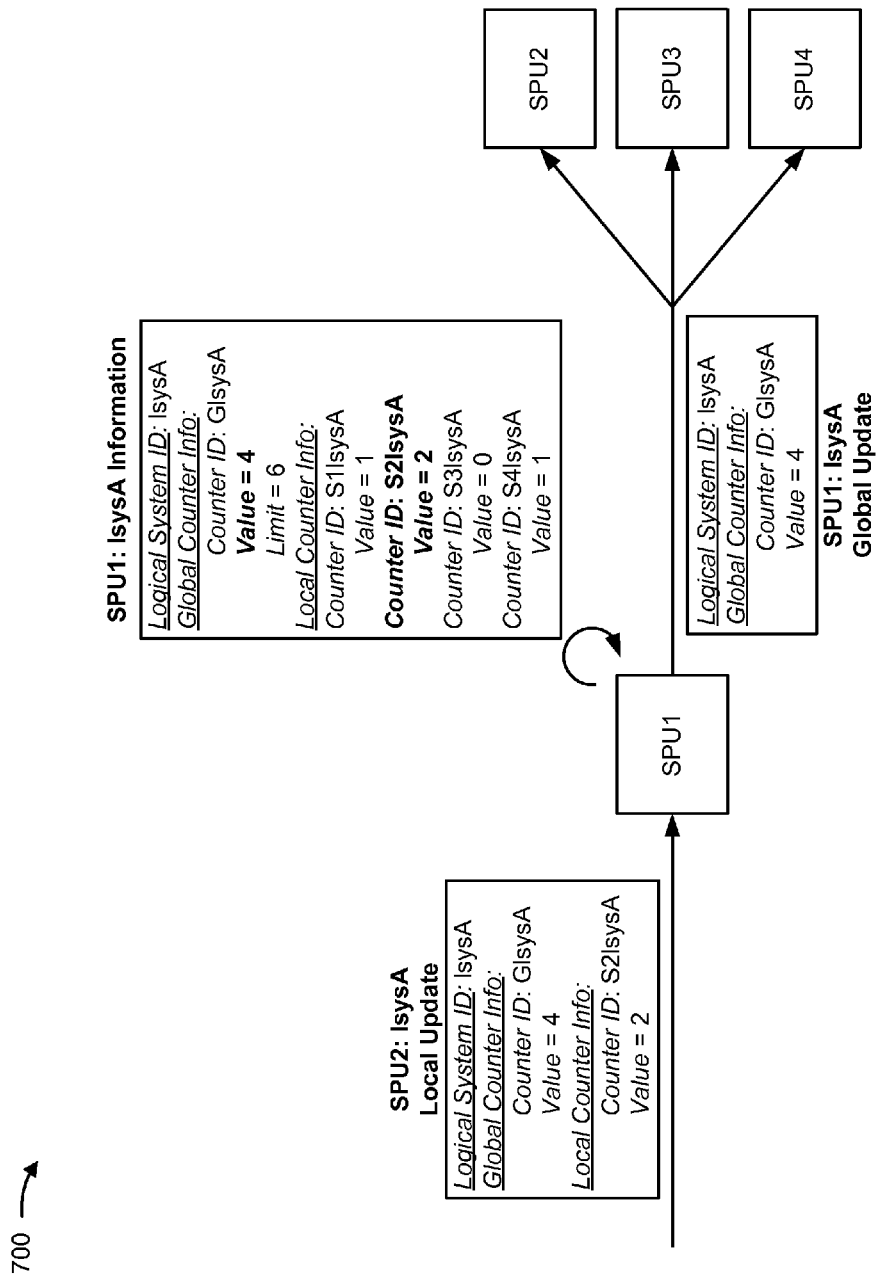

For the purposes of FIG. 7C, assume that SPU1 stores information that identifies the static global counter associated with lsysA (e.g., GlsysA), a counter value associated with GlsysA (e.g., Value=3), information that identifies the static local counter associated with lsysA and SPU2 (e.g., S2lsysA) and a counter value associated with S2lsysA (e.g., Value=1). Notably, the counter values stored by SPU1 are the counter values originally stored by SPU2 (e.g., before SPU2 created the session associated with lsysA).

As shown in FIG. 7C, SPU1 may receive the local update message from SPU2, and may identify (e.g., based on the information included in the local update message) the GlsysA counter and the S2lsysA counter stored by SPU1. As shown, SPU1 may update the GlsysA counter value, stored by SPU1, to match the modified static global counter value provided by SPU2 (e.g., by updating the value from 3 to 4). Similarly, SPU1 may update the S2lsysA counter value, stored by SPU1, to match the modified static local counter value provided by SPU2 (e.g., by updating the value from 1 to 2).

As further shown, SPU1 may generate and provide a global update message, associated with lsysA, based on updating the GlsysA counter value. As shown, the global update message may include information that identifies lsysA, information that identifies the GlsysA counter, and the updated GlsysA counter value. Assume that a device 200 includes four SPUs (e.g., SPU1 through SPU4). As shown, the SPU1 may provide the global update message to SPU2, SPU3, and SPU4.

Figure 7D:
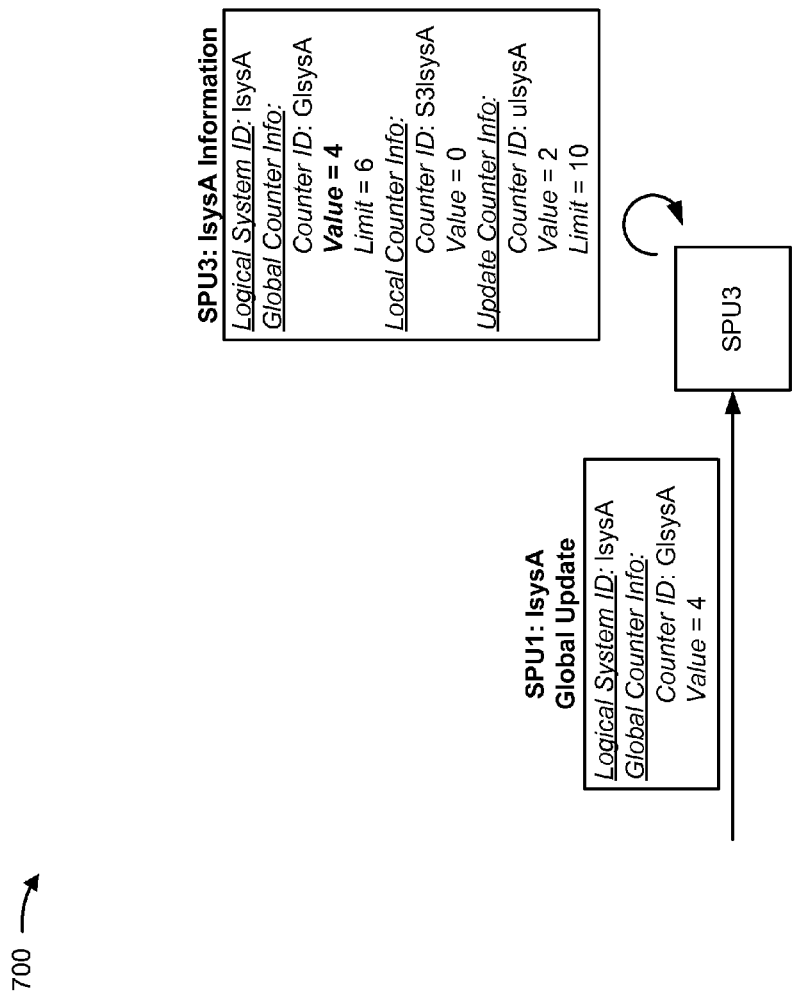

As shown in FIG. 7D, assume that SPU3 stores, inter alia, information that identifies the GlsysA counter, a counter value associated with GlsysA (e.g., Value=3), and the counter limit (e.g., Limit=6), associated with the GlsysA counter. As shown, SPU3 may receive the global update message from SPU1, and may identify (e.g., based on the information included in the global update message) the GlsysA counter stored by SPU3. As shown, SPU3 may update the GlsysA counter value, stored by SPU3, to match the updated static global counter value provided by SPU1 (e.g., by updating the value from 3 to 4). SPU4 may also receive the global update message and may act in a similar manner. However, SPU2 may receive the global update message, and may not update information stored by SPU2 (e.g., since SPU2 already stores the updated counter values). Rather, SPU2 may receive the global update message as an acknowledgment that SPU1 received the local update message provided by SPU2.

As indicated above, FIGS. 7A-7D is provided merely as an example. Other examples are possible and may differ from what was described with regard to FIGS. 7A-7D.

Figure 8:
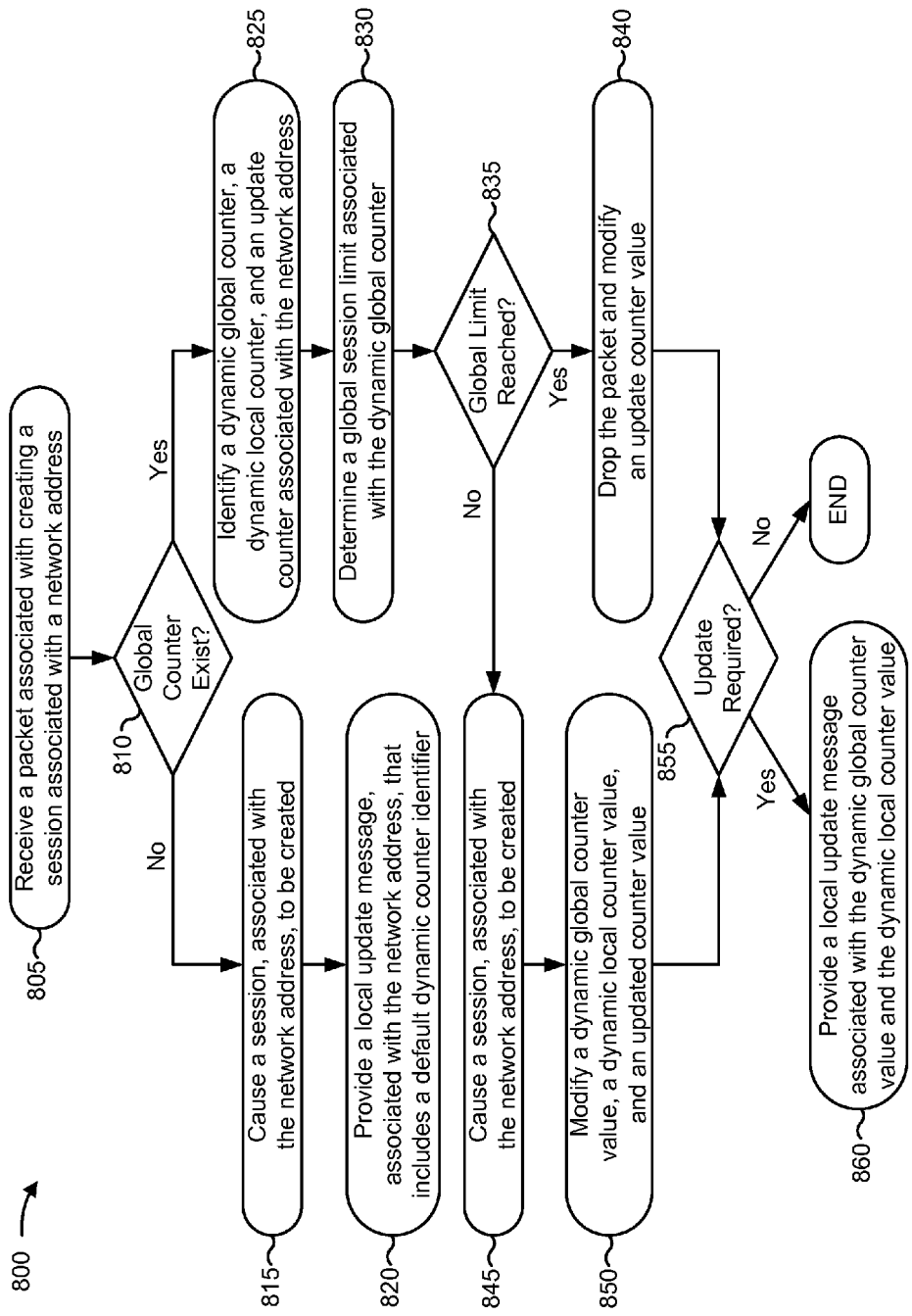
FIG. 8 is a flow chart of an example process for identifying a dynamic global counter, associated with creating a session, determining whether the session may be created, and providing a local update message associated with the dynamic global counter.
Figure 9:
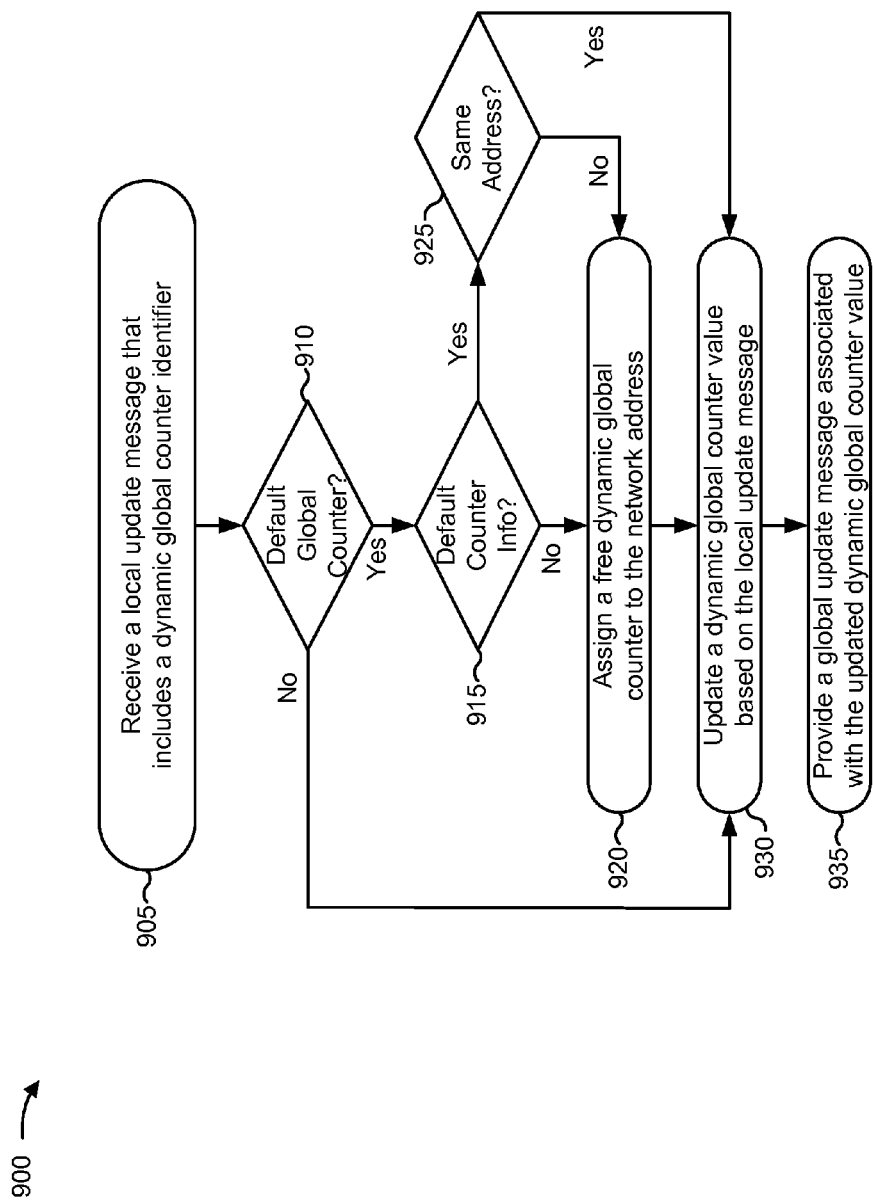
FIG. 9 is a flow chart of an example process for receiving a local update message, associated with a dynamic global counter, and providing a global update message associated with the dynamic global counter.
Figure 10:
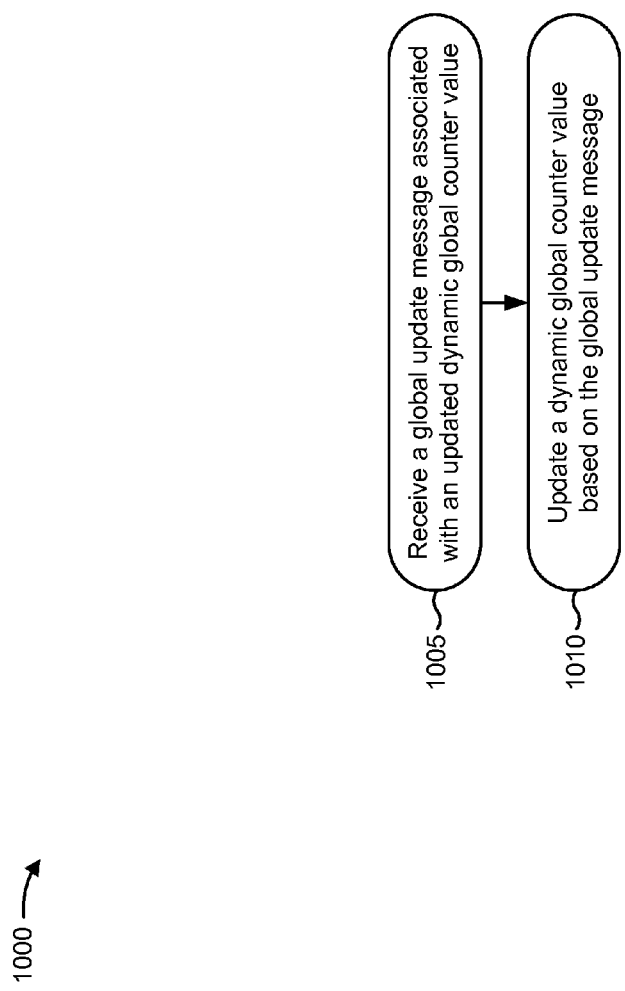
FIG. 10 is a flow chart of an example process for receiving a global update message, associated with a dynamic global counter, and updating information associated with the dynamic global counter based on the local update message.

FIG. 8 is a flow chart of an example process 800 for identifying a dynamic global counter, associated with creating a session, determining whether the session may be created, and providing a local update message associated with the dynamic global counter. In some implementations, one or more process blocks of FIG. 8 may be performed by device 200 (e.g., SPU 240). In some implementations, one or more process blocks of FIG. 8 may be performed by another device or a group of devices separate from or including device 200. As described below, FIG. 8, FIG. 9, and FIG. 10 are discussed in terms of sessions, associated with a network address, that implement dynamic counters. However, the systems and/or methods described with regard to FIG. 8, FIG. 8, and FIG. 10 may equally be applied to types of system state information that implement dynamic counters other than sessions associated with a network address.

As shown in FIG. 8, process 800 may include receiving a packet associated with creating a session associated with a network address (block 805). For example, SPU 240 may receive a packet associated with creating a session associated with a network address. In some implementations, SPU 240 may receive the packet when the packet is provided via another component of device 200, such as input component 210 and/or switching component 220. For example, switching component 220 may receive the packet, via input component 210, and may forward the packet to SPU 240.

In some implementations, the packet may include information indicating that SPU 240 is to create a session between device 200 and another device (e.g., a user device, a server device, etc.) identified by the network address. In some implementations, the packet may include information that identifies the other device associated with the session request (e.g., a device identifier), the network address (e.g., an internet protocol (IP) address, etc.) associated with the other device, and/or other information.

As further shown in FIG. 8, process 800 may include determining whether a dynamic global counter has been assigned to the network address (block 810). For example, SPU 240 may determine whether a dynamic global counter has been assigned to the network address. In some implementations, SPU 2240 may determine whether the dynamic global counter has been assigned when SPU 240 receives the packet associated with creating the session associated with the network address.

In some implementations, SPU 240 may determine whether a dynamic global counter has been assigned based on information stored by SPU 240. For example, SPU 240 may store information that identifies one or more dynamic global counters that have been assigned (e.g., as described below) to one or more corresponding network addresses, and SPU 240 may determine whether a dynamic global counter has been assigned to the network address based on the information stored by SPU 240.

For example, SPU 240 may store information that identifies a first dynamic global counter that has been assigned to a first IP address and information that identifies a second dynamic global counter that has been assigned to a second IP address. In one example, SPU 240 may receive a packet associated with creating a session associated with a third IP address, and SPU 240 may determine that a global counter has not been assigned to the third IP address (e.g., since SPU 240 does not store any information associated with the third IP address). In another example, SPU 240 may receive a packet associated with creating a session associated with the first IP address, and SPU 240 may determine that a global counter has been assigned to the first IP address (e.g., since SPU 240 stores information that identifies the dynamic global counter assigned to the first IP address)

As further shown in FIG. 8, if a dynamic global counter has not been assigned to the network address (block 810—NO), then process 800 may include causing a session, associated with the network address, to be created (block 815). For example, SPU 240 may determine that a dynamic global counter has not been assigned to the network address, and SPU 240 may cause a session, associated with the network address, to be created (e.g., SPU 240 may store information regarding the session in a memory location in memory).

As further shown in FIG. 8, process 800 may include providing a local update message, associated with the network address, that includes a default dynamic global counter identifier (block 820). For example, SPU 240 may generate a local update message, and may provide the local update message, associated with the network address, that includes a default dynamic global counter identifier. In some implementations, SPU 240 may provide the local update message that includes the default dynamic global counter identifier when SPU 240 causes the session, associated with the network address for which no dynamic global counter has been assigned, to be created.

In some implementations, a local update message may include a message that includes information associated with a default dynamic global counter. For example, each SPU 240 included in device 200 may store information identifying a default global counter identifier (e.g., a default string of characters, a default counter identification number, etc.). In this example, if SPU 240 receives a packet associated with creating a session associated with a network address that has not been assigned a dynamic global counter, then SPU 240 may be configured to include the default counter identifier in a local update message to be provided to the central SPU 240. In some implementations, the local update message may include the default counter identifier and the network address associated with the session request.

Additionally, or alternatively, the local update message may include information associated with a dynamic local counter associated with the network. For example, SPU 240 may receive the packet including the network address, may determine that no global counter exists, and may assign a dynamic local counter to the network address. A dynamic local counter may include a counter, stored and managed by SPU 240, that may be assigned to a first network address, freed (e.g., after all sessions, associated with the first network address and created by SPU 240, have been terminated), and reassigned to a second network address (e.g., such that the dynamic local counter may be reused). In some implementations, SPU 240 may assign a dynamic local counter to the network address, may increase a dynamic local counter value, associated with the assigned dynamic local counter, and may include information associated with the dynamic local counter (e.g., a dynamic local counter identifier, the dynamic local counter value, etc.) in the local update message.

In some implementations SPU 240 may provide the local update message to a central SPU 240 (e.g., a particular SPU 240 that is configured to manage the distribution of global information associated with the network address) via one or more other components of device 200.

As further shown in FIG. 8, if a dynamic global counter, associated with the network address, does exist (block 810—YES), then process 800 may include identifying the dynamic global counter, a dynamic local counter, and an update counter associated with the network address (block 825). For example, SPU 240 may identify a dynamic global counter, a dynamic local counter, and an update counter associated with the network address. In some implementations, SPU 240 may identify the dynamic global counter, the dynamic local counter, and the update counter when SPU 240 determines that the dynamic global counter has been assigned to the network address.

A dynamic global counter may include a counter, managed by the central SPU 240, that may indicate a total quantity of active sessions, associated a network address, across all SPUs 240 included in device 200. For example, if device 200 includes ten SPUs 240, then the dynamic global counter may indicate a total number of active sessions, associated with a network address, across the ten SPUs 240. In some implementations, the dynamic global counter may be assigned to a first network address, freed (e.g., after all sessions, associated with the first network address and created by any SPU 240 included in device 200, have been terminated), and reassigned to a second network address by the central SPU 240 (e.g., such that the dynamic local counter may be reused). In some implementations, the dynamic global counter may be increased and/or decreased as sessions, associated with the network address, are created and/or terminated.

An update counter may include a counter associated with providing a local update message (e.g., an update message associated with the dynamic global counter and/or the dynamic local counter) to a central SPU 240, similar to the manner discussed above with regard to block 410.

In some implementations, SPU 240 may identify the dynamic global counter, the dynamic local counter, and the update counter based on information included in the packet. For example, the packet may include information that identifies the network address, and SPU 240 may identify the global dynamic counter, the local dynamic counter, and the update counter based on information (e.g., stored by SPU 240) that identifies the global dynamic counter, the local dynamic counter, and the update counter that have been assigned to the network address included in the packet.

As further shown in FIG. 8, process 800 may include determining a global limit associated with the dynamic global counter (block 830). For example, SPU 240 may determine a global limit associated with the dynamic global counter. In some implementations, SPU 240 may determine the global limit when SPU 240 identifies the dynamic global counter, the dynamic local counter, and the update counter (e.g., after SPU 240 identifies the dynamic global counter, the dynamic local counter, and the update counter).

A global limit may include information that identifies a maximum total quantity of active sessions, associated with a global counter, that may be active across all SPUs 240 at any given time, as described above with regard to block 415. In some implementations, SPU 240 may determine the global limit based on the information that identifies the dynamic global counter. For example, SPU 240 may store information that identifies a standard global limit for all dynamic global counters, and SPU 240 may determine the global limit, associated with the dynamic global counter, based on the information stored by SPU 240.

As further shown in FIG. 8, process 800 may include determining whether the global limit, associated with the dynamic global counter, has been reached (block 835). For example, SPU 240 may determine whether the global limit, associated with the dynamic global counter, has been reached in a manner similar to that described above with regard to block 420.

As further shown in FIG. 8, if the global limit has been reached (block 835—YES), then process 800 may include dropping the packet and modifying an update counter value (block 840). For example, SPU 240 may determine that the global limit has been reached, and SPU 240 may modify an update counter value associated with the update counter, in a manner similar to that described above with regard to block 425.

As further shown in FIG. 8, if the global limit has not been reached (block 835—NO), then process 800 may include causing a session, associated with the network address, to be created (block 845). For example, SPU 240 may determine that the global limit has not been reached (block 835—NO), then process 800 may include causing a session, associated with the network address, to be created, as described above with regard to block 815.

As further shown in FIG. 8, process 800 may include modifying a dynamic global counter value, a dynamic local counter value, and an update counter value (block 850). For example, SPU 240 may modify the dynamic global counter, the dynamic local counter, and the update counter, in a manner similar to that described above with regard to block 435.

As further shown in FIG. 8, process 800 may include determining whether a local update message is required (block 855). For example, SPU 240 may determine whether a local update message, associated with the dynamic global counter, is required based on modifying the update counter value, based on a threshold amount of time, etc., as described above with regard to block 440.

As further shown in FIG. 8, if a local update message is required (block 855—YES), then process 800 may include providing a local update message associated with the dynamic global counter value and the dynamic local counter value (block 860). For example, SPU 240 may determine that a local update message is required, and SPU 240 may provide a local update message associated with the modified dynamic global counter value and the modified dynamic local counter value, in a manner similar to that described above with regard to block 445.

A local update message may include a message that includes information associated with the modified dynamic global counter value and the modified dynamic local counter value. In some implementations, the local update message may include information that identifies the network address, information that identifies the dynamic global counter, the modified dynamic global counter value, information that identifies the dynamic local counter, the modified dynamic local counter value, and/or other information.

As further shown in FIG. 8, if a local update message is not required (block 855—NO), then process 800 may include ending process 800. For example, SPU 240 may determine that a local update message is not required, and SPU 240 may wait to receive another packet associated with the network address. In some implementations, SPU 240 may be configured not to provide a local update message following every modification to the dynamic global counter and the dynamic local counter in order to minimize communications between SPUs 240 included in device 200.

Although FIG. 8 shows example blocks of process 800, in some implementations, process 800 may include additional blocks, different blocks, fewer blocks, or differently arranged blocks than those depicted in FIG. 8. Additionally, or alternatively, one or more of the blocks of process 800 may be performed in parallel.

FIG. 9 is a flow chart of an example process 900 for receiving a local update message, associated with a dynamic global counter, and providing a global update message associated with the dynamic global counter. In some implementations, one or more process blocks of FIG. 9 may be performed by device 200 (e.g., SPU 240). In some implementations, one or more process blocks of FIG. 9 may be performed by another device or a group of devices separate from or including device 200.

As shown in FIG. 9, process 900 may include receiving a local update message that includes a dynamic global counter identifier (block 905). For example, a central SPU 240 may receive a local update message that includes a dynamic global counter identifier. In some implementations, the central SPU 240 may receive the local update message when another SPU 240 provides the local update message (e.g., via one or more other components of device 200).

In some implementations, the local update message may include information (e.g., a counter identifier, a counter value, etc.) associated with a dynamic global counter value and/or a dynamic local counter value that have been modified by another SPU 240, as discussed above. In some implementations, the local update message may include the modified dynamic global counter value that corresponds to a dynamic global counter value stored by the central SPU 240 (e.g., the modified dynamic global counter value may be an up to date version of the dynamic global counter value stored by the central SPU 240). Additionally, or alternatively, the local update message may include a default dynamic counter identifier, as discussed above.

As further shown in FIG. 9, process 900 may include determining whether the dynamic global counter identifier is a default dynamic global counter identifier (block 910). For example, the central SPU 240 may determine whether the dynamic global counter identifier, included in the local update message, is a default dynamic global counter identifier. In some implementations, the central SPU 240 may determine whether the dynamic global counter identifier is a default dynamic global counter identifier when the central SPU 240 receives the local update message (e.g., after the central SPU 240 receives the local update message).

In some implementations, the central SPU 240 may determine whether the dynamic global counter identifier, included in the local update message, is a default dynamic global counter identifier based on information stored by the central SPU 240. For example, each SPU 240 included in device 200 (e.g., including the central SPU 240) may store information that identifies a default dynamic global counter, and the central SPU 240 may determine whether the dynamic global counter identifier, included in the local update message, matches the default dynamic global counter identifier stored by the central SPU 240. In this example, if the central SPU 240 determines that the dynamic global counter identifier matches the default dynamic global counter identifier, then the central SPU 240 may determine that the dynamic global counter identifier is the default dynamic global counter identifier. Conversely, if the central SPU 240 determines that the dynamic global counter identifier does not match the default dynamic global counter identifier, then the central SPU 240 may determine that the dynamic global counter identifier is not the default dynamic global counter identifier.

As further shown in FIG. 9, if the dynamic global counter identifier is not the default dynamic global counter identifier (block 910—NO), then process 900 may include updating a dynamic global counter (e.g., a dynamic global counter associated with the dynamic global counter identifier included in the local update message) based on the local update message, as described below with regard to block 930.

As further shown in FIG. 9, if the dynamic global counter identifier is the default dynamic global counter identifier (block 910—YES), then process 900 may include determining whether counter information, associated with the default dynamic global counter identifier, exists (block 915). For example, the central SPU 240 may determine that the dynamic global counter identifier is the default dynamic global counter identifier, and the central SPU 240 may determine whether counter information, associated with the default dynamic global counter identifier, exists.

In some implementations, the central SPU 240 may determine whether counter information, associated with the default dynamic global counter identifier, exists based on information stored by the central SPU 240. For example, the central SPU 240 may store counter information (e.g., information indicating that a dynamic global counter is being used to track a global quantity of sessions) that corresponds to multiple dynamic global counters. In this example, the central SPU 240 may determine that counter information, associated with the default dynamic counter identifier, exists when the central SPU 240 stores information indicating that a default dynamic global counter (e.g., identified by the default dynamic global counter identifier), is being used to track a global quantity of sessions associated with a network address. In some implementations, the counter information may include a default dynamic counter identifier, a default dynamic counter value, a network address to which the default dynamic counter is assigned, and/or other information associated with the default dynamic global counter.

As further shown in FIG. 9, if counter information, associated with the default dynamic global counter identifier, does not exist (block 915—NO), then process 900 may include assigning a free dynamic global counter to the network address (block 920). For example, the central SPU 240 may determine that counter information, associated with the default dynamic global counter identifier, does not exist, and the central SPU 240 may assign a free dynamic global counter to the network address identified in the local update message.

A free dynamic global counter may include a dynamic global counter, known to the central SPU 240, that is not currently assigned to a network address (e.g., the free dynamic global counter is not being used to track a quantity of global sessions). In some implementations, the central SPU 240 may assign a free dynamic global counter based on information stored by the central SPU 240. For example, the central SPU 240 may store information (e.g., a list, a table, a data structure, etc.) that identifies a set of free dynamic local counters, and the central SPU 240 may assign a free dynamic global counter to the network address based on the stored information. In some implementations, the central SPU 240 may update the information, stored by the central SPU 240, that identifies the set of free dynamic local counters (e.g., the central SPU 240 may add and/or remove dynamic local counters from the set of free dynamic local counters as dynamic global counters are freed and/or assigned).

In some implementations, the central SPU 240 may randomly assign a free dynamic global counter to the network address. Additionally, or alternatively, the central SPU 240 may assign a free dynamic global counter to the network address based on a queue, associated with assigning free dynamic global counters, managed by the central SPU 240. Additionally, or alternatively, the central SPU 240 may assign a free dynamic local counter in another manner.

As further shown in FIG. 9, process 900 may further include updating a dynamic global counter value (e.g., a counter value associated with the free dynamic local counter assigned to the network address) based on the local update message, as described below with regard to block 930.

As further shown in FIG. 9, if counter information, associated with the default dynamic global counter identifier, does exist (block 915—YES), then process 900 may include determining whether the network address, included in the local update message, matches a network address included in the counter information associated with the default dynamic global counter (block 925). For example, the central SPU 240 may determine that counter information, associated with the default dynamic global counter identifier, does exist, and the central SPU 240 determine whether the network address, included in the local update message, matches a network address included in the counter information.

In some implementations, the central SPU 240 may determine whether the network address included in the local update message matches the network address included in the counter information by comparing the network addresses to determine whether the network addresses match.

As further shown in FIG. 9, if the network address, included in the local update message, does not match the network address included in the counter information (block 925—NO), then process 900 may include assigning a free dynamic global counter to the network address included in the local update message, as described above with regard to block 920.

As further shown in FIG. 9, if the network address, included in the local update message, matches the network address included in the counter information (block 925—YES), then process 900 may include updating a dynamic global counter value (e.g., a counter value associated with the default dynamic local counter) based on the local update message, as described below with regard to block 930.

As further shown in FIG. 9, process 900 may include updating a dynamic global counter value based on the local update message (block 930). For example, the central SPU 240 may update a dynamic global counter value based on the local update message.

In some implementations, the central SPU 240 may update the dynamic global counter value (e.g., a counter value associated with a previously assigned dynamic global counter) after the central SPU 240 determines that the dynamic global counter identifier, included in the local update message, is not the default dynamic global counter identifier (e.g., see block 915). Alternatively, the central SPU 240 may update the dynamic global counter value (e.g., a counter value associated with a dynamic global counter assigned to the network address) after the central SPU 240 assigns the free dynamic global counter to the network address (e.g., see block 920). Alternatively, the central SPU 240 may update the dynamic global counter (e.g., a counter value associated with the default dynamic global counter) after the central SPU 240 determines that the network address, included in the local update message, matches the network address included in the counter information associated with the default dynamic global counter (e.g., see block 925).

In some implementations, the central SPU 240 may update the dynamic global counter value such that a first counter value, stored by the central SPU 240 is updated to reflect a second counter value (e.g., rather than the first counter value), as discussed above. Additionally, or alternatively, the central SPU 240 may update counter information, stored by the central SPU 240, to indicate that a particular counter is assigned to a particular network address. In this way, the central SPU 240 may maintain up to date dynamic global counter information based on local update messages received from other SPUs 240.

In some implementations, the central SPU 240 may update a global counter, stored by the central SPU 240, in a similar manner. In this way, the central SPU 240 may store information that identifies a quantity of sessions, associated with the network, that are being managed by each of the SPUs 240 included in device 200.

As further shown in FIG. 9, process 900 may include providing a global update message associated with the update dynamic global counter value (block 935). For example, the central SPU 240 may provide a global update message, associated with the updated dynamic global counter value, in a manner similar to that described with regard to block 515.

In some implementations, the global update message may include information that identifies the network address associated with the dynamic global counter, information that identifies the dynamic global counter, the updated dynamic global counter value, and/or other information. In some implementations, the central SPU 240 may generate the global update message.

Although FIG. 9 shows example blocks of process 900, in some implementations, process 900 may include additional blocks, different blocks, fewer blocks, or differently arranged blocks than those depicted in FIG. 9. Additionally, or alternatively, one or more of the blocks of process 900 may be performed in parallel.

FIG. 10 is a flow chart of an example process 1000 for receiving a global update message, associated with a dynamic global counter, and updating a dynamic global counter value based on the local update message. In some implementations, one or more process blocks of FIG. 10 may be performed by device 200 (e.g., SPU 240). In some implementations, one or more process blocks of FIG. 10 may be performed by another device or a group of devices separate from or including device 200.

As shown in FIG. 10, process 1000 may include receiving a global update message associated with an updated dynamic global counter value (block 1005). For example, SPU 240 may receive a global update message associated with an updated dynamic global counter, in a manner similar to the described above with regard to block 605.

As further shown in FIG. 10, process 1000 may include updating a dynamic global counter value based on the global update message (block 1010). For example, SPU 240 may update a dynamic local counter value, stored by SPU 240, based on the updated dynamic global counter value included in the global update message, in a manner similar to that described above with regard to block 610.

Additionally, or alternatively, SPU 240 may update information associated with the dynamic global counter based on the network address included in the global update message. For example, the global update message may include information indicating that the dynamic global counter has been assigned to the network address, and SPU 240 may update counter information (e.g., stored by SPU 240 and associated with the dynamic global counter) to reflect that the dynamic global counter has been assigned to the network address.

Although FIG. 10 shows example blocks of process 1000, in some implementations, process 1000 may include additional blocks, different blocks, fewer blocks, or differently arranged blocks than those depicted in FIG. 10. Additionally, or alternatively, one or more of the blocks of process 1000 may be performed in parallel.

FIGS. 11A-11D are diagrams of an example implementation 1100 relating to example process 800, 900, and 1000 shown in FIG. 8, FIG. 9, and FIG. 10, respectively. For the purposes of example implementation 1100, assume that an SPU (e.g., SPU4) is capable of creating and managing a session associated with a network address (e.g., 192.52.6.2).

Figure 11A:
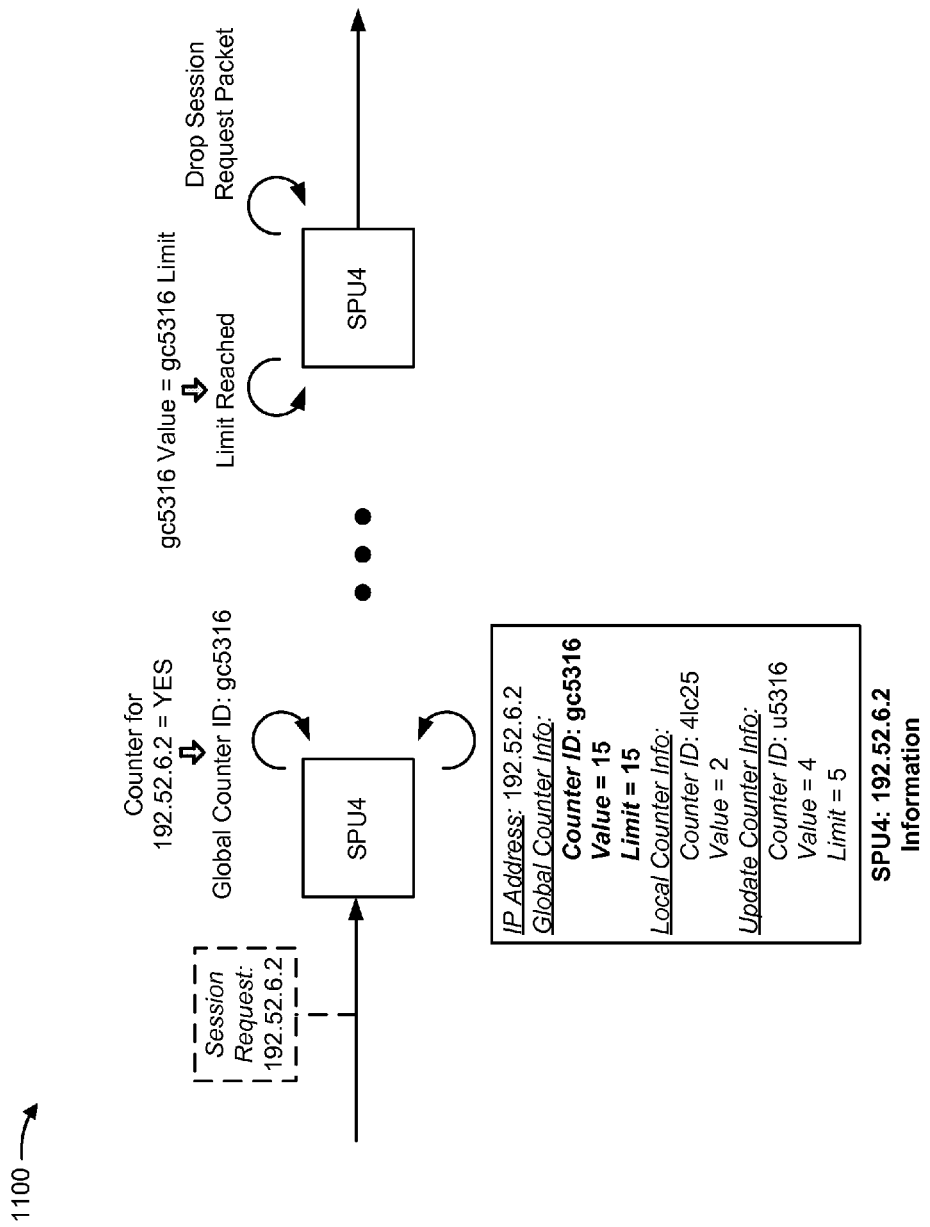

As shown in FIG. 11A, SPU4 may receive (e.g., via switching component 220) a request to create a session associated with the network address. Assume that SPU4 stores information that identifies dynamic global counters that are currently being used to track quantities of global sessions associated with IP addresses that correspond to the dynamic global counters.

For the purposes of example implementation 1100, assume that SPU4 stores information that identifies a dynamic global counter that has been assigned to the 192.52.6.2 network address (e.g., gc5316), a current counter value associated with gc5316 (e.g., Value=15), and a counter limit (e.g., Limit=15) associated with gc5316, that indicates a global limit associated with the network address. Also, assume that SPU4 stores information that identifies a dynamic local counter (e.g., 4lc25) that has been assigned (e.g., by SPU4) to the network address, and a current counter value associated with 4lc25 (e.g., Value=2). Finally, assume that SPU4 stores information that identifies an update counter associated with the gc5316 counter (e.g., u5316), a current counter value associated with u5316 (e.g., Value=4), and a counter limit (e.g., Limit=5), associated with u5316, that indicates an update counter threshold associated with u5316.

As shown, SPU4 may determine (e.g., based on the information stored by SPU4) that a dynamic global counter (e.g., identified as gc5316) has been assigned to the 192.52.6.2 network address, as discussed above. As shown, SPU4 may determine (e.g., based on the information stored by SPU4) the counter information, associated with the network address, stored by SPU4. As shown, the counter information may include the information associated with the dynamic global counter, the dynamic local counter, and the update counter, as described above.

As further shown in FIG. 11A, SPU4 may determine that the counter value of the gc5316 counter (e.g., 15) has reached the global limit of the gc5316 (e.g., 15), and SPU4 may drop the session request packet associated with the network address.

Figure 11B:
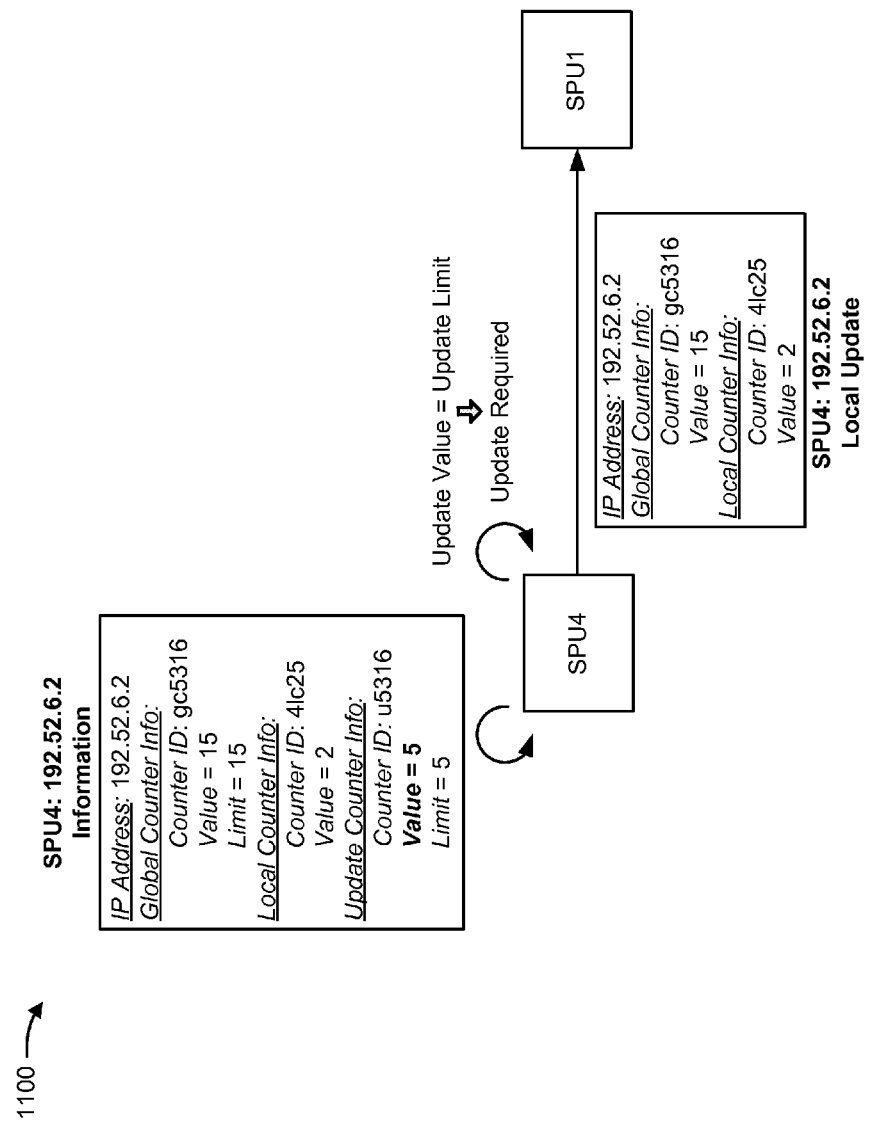

As shown in FIG. 11B, SPU4 may modify the u5316 counter value by increasing the value by one (e.g., from 4 to 5). As further shown, SPU4 may determine whether a local update message, associated with the gc5316 counter, is required. As shown, SPU4 may determine that the u5316 counter value satisfies the update counter threshold indicated by the u5316 counter limit (e.g., since the u5316 counter value and the u5316 counter limit value both equal 5), and SPU4 may determine that a local update message, associated with gc5316, is required.

As further shown, SPU4 may generate and provide a local update message associated with gc5316. As shown, the local update message may include the network address to which gc5316 is assigned, the gc5316 counter value, information identifying the 4lc25 counter, and the 4lc25 counter value. As shown, assume that another SPU, SPU1, is configured to act as a central SPU for distributing global information associated with the gc5316 counter. As shown, SPU4 may provide the local update message to SPU1.

For the purposes of FIG. 11C, assume that SPU1 stores information that identifies the dynamic global counter assigned to the network address (e.g., gc5316), a counter value associated with gc5316 (e.g., Value=14), information that identifies the dynamic local counter assigned to the network address by SPU4 (e.g., 4lc25) and a counter value associated with 4lc25 (e.g., Value=1). Assume that the counter values stored by SPU1 are counter values provided to SPU1 by SPU4 in a previous update message (e.g., before the global limit was reached).

As shown in FIG. 11C, SPU1 may receive the local update message from SPU4 and may determine (e.g., based on information stored by SPU4 that identifies a default counter identifier), that the counter identifier included in the local update message is not the default counter identifier. As shown, SPU1 may identify (e.g., based on the information included in the local update message) the gc5316 counter and the 4lc25 counter stored by SPU1. As shown, SPU1 may update the gc5316 counter value, stored by SPU1, to match the gc5316 counter value provided by SPU4 (e.g., by updating the value from 14 to 15). Similarly, SPU1 may update the 4lc25 counter value, stored by SPU1, to match the dynamic local counter value provided by SPU4 (e.g., by updating the value from 1 to 2).

As further shown, SPU1 may generate and provide a global update message, associated with gc5316, based on updating the dynamic global counter value. As shown, the global update message may include information that identifies the network address to which gc5316 is assigned, information that identifies the gc5316 counter, and the updated gc5316 counter value. Assume that a device 200 includes four SPUs (e.g., SPU1 through SPU4). As shown, the SPU1 may provide the global update message to SPU2, SPU3, and SPU4.

Figure 11D:
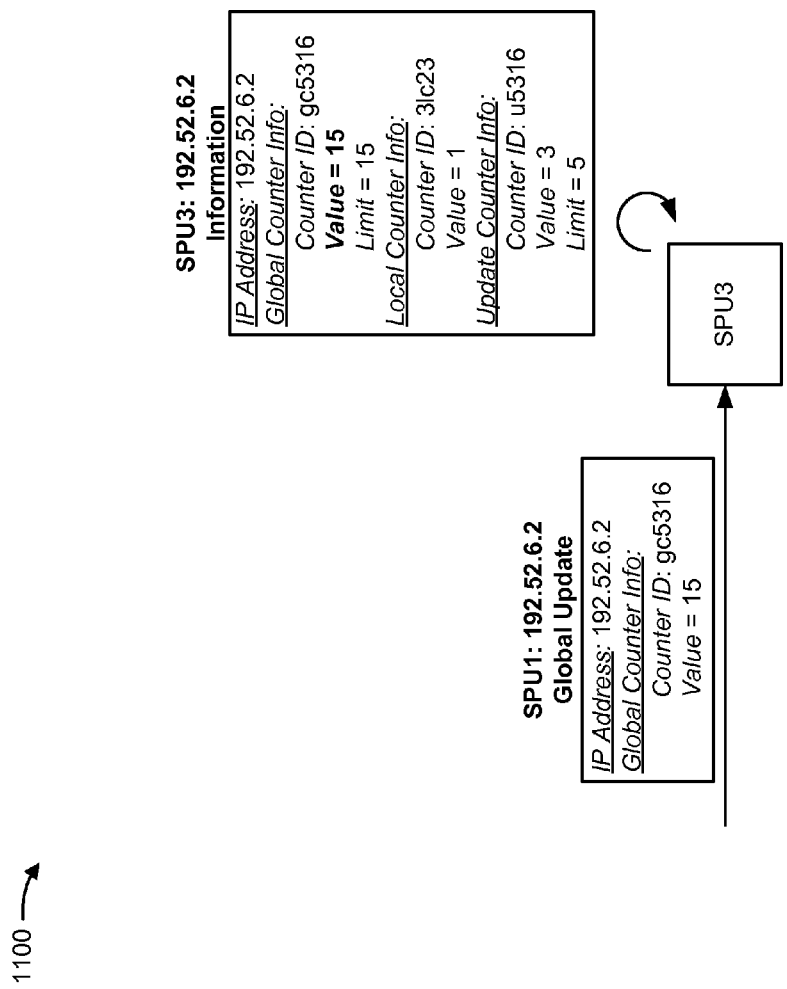

As shown in FIG. 11D, assume that SPU3 stores, inter alia, information that identifies the gc5316 counter, a counter value associated with gc5316 (e.g., Value=14), and the counter limit (e.g., Limit=15) associated with gc5316. As shown, SPU3 may receive the global update message from SPU1, and may identify (e.g., based on the information included in the global update message) the gc5316 counter stored by SPU3. As shown, SPU3 may update the gc5316 counter value, stored by SPU3, to match the updated dynamic global counter value provided by SPU1 (e.g., by updating the value from 14 to 15). SPU2 may also receive the global update message and may act in a similar manner. However, SPU4 may receive the global update message, and may not update information stored by SPU4 (e.g., since SPU4 already stores updated counter information). Rather, SPU4 may receive the global update message as an acknowledgment that SPU1 received the local update message provided by SPU4.

As indicated above, FIGS. 11A-11D is provided merely as an example. Other examples are possible and may differ from what was described with regard to FIGS. 11A-11D.

Figure 12A:
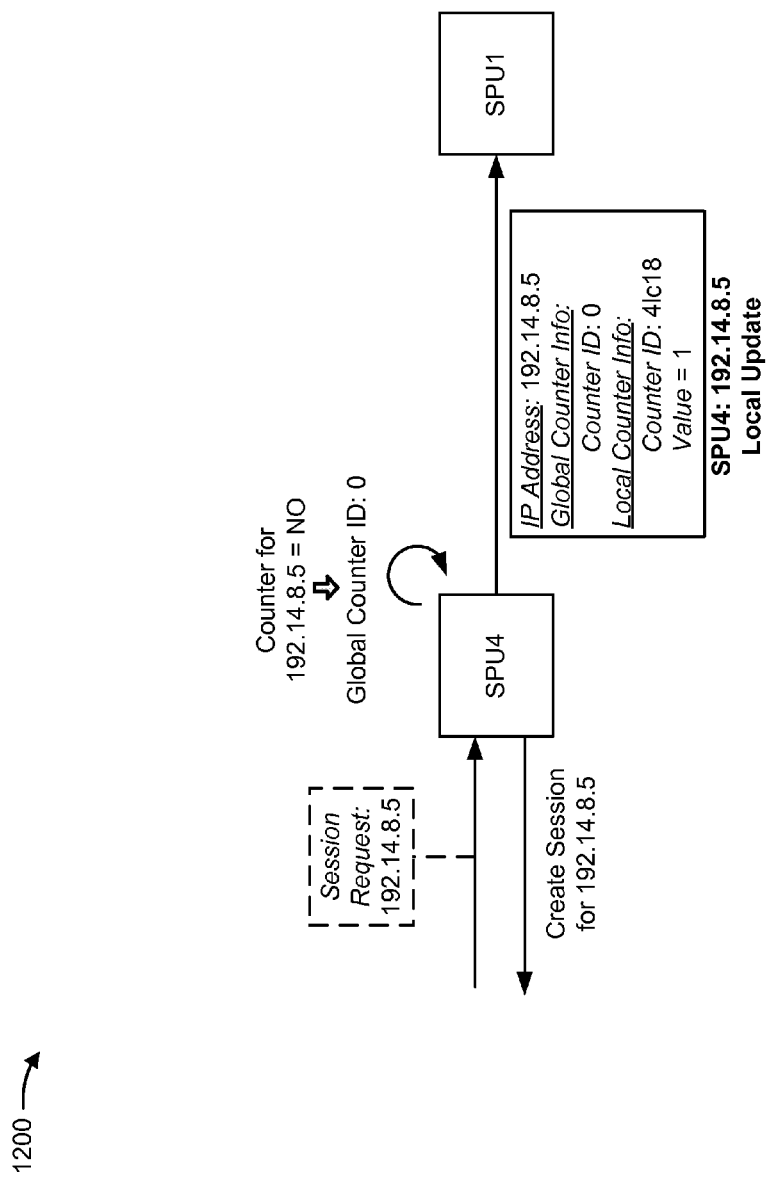
Figure 12B:
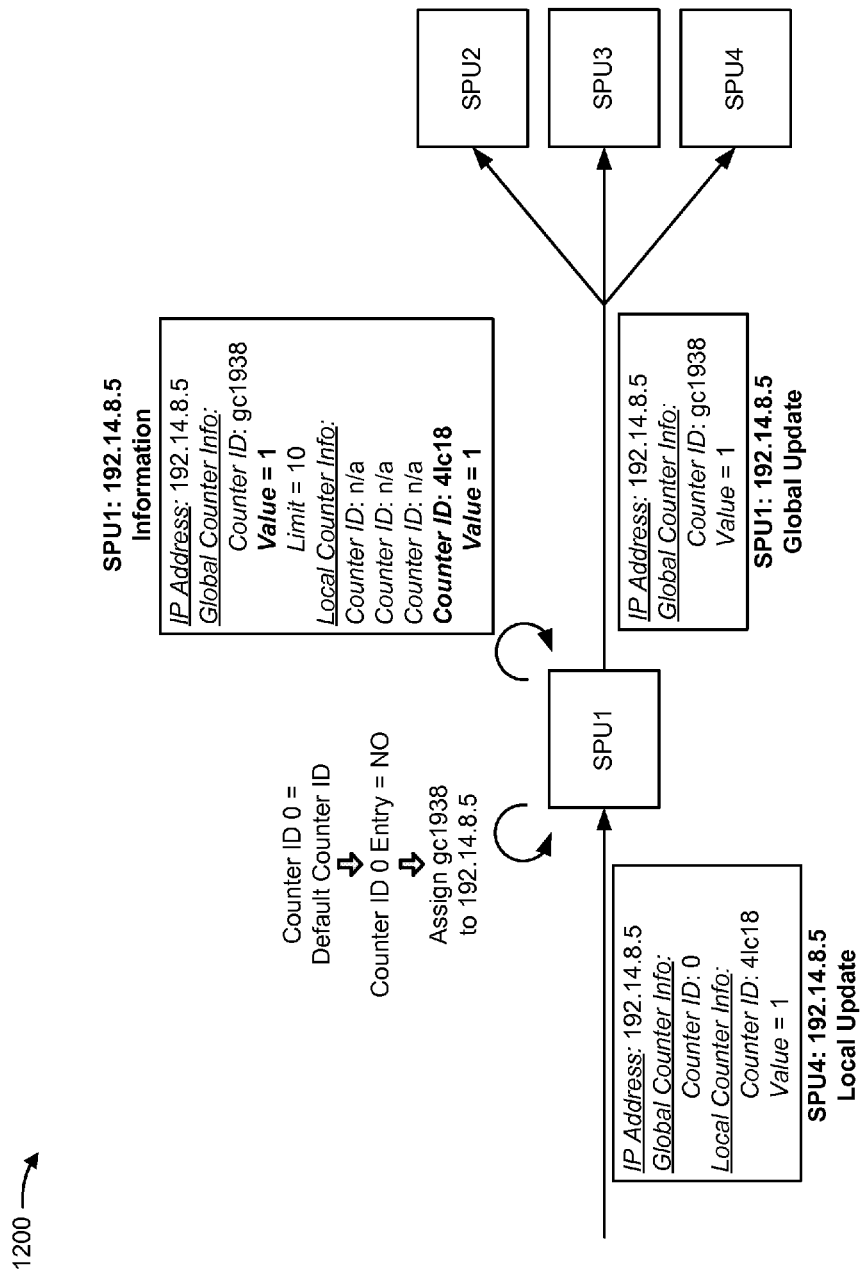

FIGS. 12A-12C are diagrams of an additional example implementation 1200 relating to example process 800, 900, and 1000 shown in FIG. 8, FIG. 9, and FIG. 10, respectively. For the purposes of example implementation 1200, assume that an SPU (e.g., SPU4) is capable of creating and managing a session associated with a network address (e.g., 192.14.8.5).

As shown in FIG. 12A, SPU4 may receive (e.g., via switching component 220) a request to create a session associated with a device associated with the network address. Assume that SPU4 stores information that identifies dynamic global counters that are currently being used to track quantities of global sessions associated with IP addresses that correspond to the dynamic global counters.

For the purposes of example implementation 1200, assume that SPU4 does not store information that identifies a dynamic global counter that has been assigned to the 192.14.8.5 network address. As shown, SPU4 may determine (e.g., based on the information stored by SPU4) that a dynamic global counter has not been assigned to the 192.14.8.5 network address, and SPU4 may create a session associated with the network address.

As further shown, SPU4 may generate and provide a local update message associated with the network address. As shown, the local update message may include the network address associated with the session, a default counter identifier (e.g., 0), information identifying a dynamic local counter that SPU4 has assigned to the network address (e.g., 4lc18), and a 4lc18 counter value (e.g., 1) determined based on assigning the 4lc18 counter to the network address and creating the session. Assume that another SPU, SPU1, is configured to act as a central SPU for distributing global information associated with dynamic global counters. As shown, SPU4 may provide the local update message to SPU1.

For the purposes of FIG. 12B, assume that SPU1 stores information associated with a default dynamic global counter (e.g., the default dynamic global counter identifier, 0), and information associated with free dynamic global counters that may be assigned to network addresses. As shown in FIG. 12B, SPU1 may receive the local update message from SPU4, and may identify (e.g., based on the information included in the local update message) that the local update message includes the default dynamic counter identifier. As further shown, SPU1 may determine that SPU1 does not store counter information associated with the default dynamic global counter (e.g., the default dynamic global counter is not being used to track global session information associated with a network address).

As further shown, SPU1 may determine a free dynamic global counter (e.g., identified as gc1938), and may assign gc1938 to the network address. As shown, SPU1 may update the counter information (e.g., stored by SPU1) to reflect that gc1938 has been assigned to the network address, and may update a gc1938 counter value to reflect that a session, associated with gc1938, has been created. As shown, SPU1 may also update dynamic local counter information, stored by SPU, based on the local update message received from SPU4.

As further shown, SPU1 may generate and provide a global update message, associated with gc1938, based on assigning and updating the dynamic global counter. As shown, the global update message may include information that identifies the network address to which gc1938 is assigned, information that identifies the gc1938 counter, and the updated gc1938 counter value. Assume that a device 200 includes four SPUs (e.g., SPU1 through SPU4). As shown, the SPU1 may provide the global update message to SPU2, SPU3, and SPU4.

As shown in FIG. 12C, assume that SPU3 receives the global update message from SPU1, and updates counter information, stored by SPU3, to reflect that the gc1938 counter has been assigned to the 192.14.8.5 network address and that one session, associated with the network address, has been created. SPU2 and SPU4 may also receive the global update message and may act in a similar manner. SPU4 may also receive the global update message as an acknowledgment that SPU1 received the local update message provided by SPU4.

As indicated above, FIGS. 12A-12C is provided merely as an example. Other examples are possible and may differ from what was described with regard to FIGS. 12A-12C.

Implementations described herein may allow for global control among multiple SPUs by allowing each of the multiple SPUs to provide a local update (e.g., that includes local state information) to a central SPU that is configured to provide a global update (e.g., that includes global state information) to the multiple SPUs.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a first security processing unit (SPU) of a device, a packet associated with a request to create a session,
        the device including a plurality of SPUs;
    identifying, by the first SPU and based on information included in the packet, information associated with a global counter and information associated with an update counter associated with the global counter,
        the global counter being used to track a total quantity of sessions that are active across the plurality of SPUs,
        the information associated with the global counter including a global counter identifier and a global counter value, and
        the information associated with the update counter including an update counter identifier and an update counter value;
    identifying, by the first SPU, a global limit associated with the global counter;
    determining, by the first SPU, that the global limit has not been reached based on the global counter value;
    causing, by the first SPU, the session to be created based on determining that the global limit has not been reached;
    modifying, by the first SPU and based on causing the session to be created, the global counter value to create a modified global counter value;
    modifying, by the first SPU and based on modifying the global counter value, the update counter value to create a modified update counter value;
    determining, by the first SPU, that the modified update counter value satisfies a threshold; and
    providing, by the first SPU and based on determining that the modified update counter value satisfies the threshold, a local update message,
        the local update message being provided to a second SPU, of the plurality of SPUs, and including the global counter identifier and the modified global counter value, and
        the local update message causing the second SPU to provide a global update message associated with the global counter.

2. The method of claim 1, further comprising:
    receiving, by the second SPU, the local update message provided by the first SPU;
    updating, by the second SPU, another global counter value, based on the modified global counter value, to create an updated global counter value,
        the other global counter value being associated with the global counter and being stored by the second SPU; and
    providing, by the second SPU, the global update message associated with the global counter,
        the global update message including the global counter identifier and the updated global counter value.

3. The method of claim 1, further comprising:
    receiving, by a third SPU of the plurality of SPUs, the global update message provided by the second SPU; and
    updating, by the third SPU, information associated with the global counter, stored by the third SPU, based on the global update message.

4. The method of claim 1, further comprising:
    identifying, by the first SPU, information associated with a local counter,
        the local counter being used to track a total quantity of sessions associated with only the first SPU, and
        the information associated with the local counter including a local counter identifier and a local counter value; and
    modifying, by the first SPU, the local counter value to create a modified local counter value,
        modifying the local counter being based on causing the session to be created; and where providing the local update message further comprises:
  providing, by the first SPU, the local update message including the local counter identifier and the modified local counter value.
5. The method of claim 1, further comprising:
  receiving, by the first SPU, information that identifies the global limit; and
  storing the information that identifies the global limit; and
  where identifying the global limit associated with the global counter further comprises:
    identifying the global limit based on the stored information.
6. The method of claim 1, further comprising:
  determining, by the first SPU, that the global counter value is not equal to the global limit; and
  where determining that the global limit has not been reached further comprises:
    determining that the global limit has not been reached based on determining that the global counter value is not equal to the global limit.
7. The method of claim 1, where the packet includes information that identifies a logical system associated with the request to create the session.
8. The method of claim 1, where the request to create the session includes at least one of:
  a logical system name,
  a logical system identifier, or
  a logical system identification number.
9. A device, comprising:
  a plurality of security processing units (SPUs) including a first SPU to:
    receive a request to create a session;
    identify, based on information included in the request, information associated with a global counter and information associated with an update counter corresponding to the global counter,
      the global counter being used to track a total quantity of sessions that are active across the plurality of SPUs,
      the information associated with the global counter including a global counter identifier and a global counter value, and
      the information associated with the update counter including an update counter identifier and an update counter value;
    identify a global limit associated with the global counter;
    determine that the global limit has not been met based on the global counter value;
    cause the session to be created based on determining that the global limit has not been met;
    modify the global counter value to create a modified global counter value based on the session being created;
    modify the update counter value to create a modified update counter value;
    determine that the modified update counter value satisfies a threshold;
    determine that a local update message is required based on determining that the modified update counter value satisfies the threshold,
      the local update message including the global counter identifier and the modified global counter value; and
    provide the local update message to a second SPU, of the plurality of SPUs, to cause the second SPU to provide a global update message associated with the global counter.
10. The device of claim 9, where the second SPU is to:
  receive the local update message provided by the first SPU;
  update another global counter value, based on the modified global counter value, to create an updated global counter value,
    the other global counter value being associated with the global counter and being stored by the second SPU; and
  provide the global update message associated with the global counter,
    the global update message including the global counter identifier and the updated global counter value.
11. The device of claim 9, where a third SPU, of the plurality of SPUs, is to:
  receive the global update message provided by the second SPU; and
  update counter information stored by the third SPU,
    the counter information being associated with the global counter identified in the global update message.
12. The device of claim 9,
  where the first SPU is further to:
    identify information associated with a local counter,
      the local counter being used to track a total quantity of sessions associated with only the first SPU, and
      the information associated with the local counter including a local counter identifier and a local counter value; and
    modify, based on causing the session to be created, the local counter value to create a modified local counter value; and
  where the first SPU, when providing the local update message, is further to:
    provide the local update message including the local counter identifier and the modified local counter value.
13. The device of claim 9,
  where the first SPU is further to:
    receive information that identifies the global limit; and
    store the information that identifies the global limit; and
  where the first SPU, when identifying the global limit associated with the global counter, is further to:
    identify the global limit based on the stored information.
14. The device of claim 9,
  where the first SPU is further to:
    determine that the global counter value is not equal to the global limit; and
  where the first SPU, when determining that the global limit has not been met, is further to:
    determine that the global limit has not been met based on determining that the global counter value is not equal to the global limit.
15. The device of claim 9, where the request to create the session includes at least one of:
  a logical system name,
  a logical system identifier, or
  a logical system identification number.
16. A non-transitory computer-readable medium storing instructions, the instructions comprising:

one or more instructions that, when executed by one or more security processing units (SPUs) of a plurality of SPUs of a device, cause the one or more SPUs to:
receive a request to create a session;
identify, based on information included in the request, information associated with a global counter and information associated with an update counter corresponding to the global counter,
the global counter being used to track a total quantity of sessions that are active across the plurality of SPUs,
the information associated with the global counter including a global counter identifier and a global counter value, and
the information associated with the update counter including an update counter identifier and an update counter value;
identify a global limit associated with the global counter;
determine that the global limit has not been met based on the global counter value;
cause the session to be created based on determining that the global limit has not been met;
modify the global counter value to create a modified global counter value based on the session being created;
modify the update counter value to create a modified update counter value;
determine that the modified update counter value satisfies a threshold;
determine that a local update message is required based on determining that the modified update counter value satisfies the threshold,
the local update message including the global counter identifier and the modified global counter value; and
provide, to a second SPU of the plurality of SPUs and based on determining that the local update message is required, the local update message to cause the second SPU to provide a global update message associated with the global counter.

17. The non-transitory computer-readable medium of claim 16, where the local update message includes a local counter identifier.

18. The non-transitory computer-readable medium of claim 17, where the instructions further comprise:
one or more instructions that, when executed by the one or more SPUs, cause the one or more SPUs to:
identify information associated with a local counter,
the local counter being used to track a total quantity of sessions associated with only a first security processing unit, and
the information associated with the local counter including the local counter identifier.

19. The non-transitory computer-readable medium of claim 16, where the local update message includes a modified local counter value.

20. The non-transitory computer-readable medium of claim 19, where the instructions further comprise:
one or more instructions that, when executed by the one or more SPUs, cause the one or more SPUs to:
modify, based on causing the session to be created, a local counter value to create the modified local counter value.

* * * * *